(12) United States Patent
Ranetkins et al.

(10) Patent No.: US 9,933,816 B2
(45) Date of Patent: Apr. 3, 2018

(54) WATERPROOF HOUSING WITH SWING ARM ACTUATOR FOR USE WITH DIGITAL DEVICES AND METHOD

(71) Applicant: Vals Tech Inc., Montreal (CA)

(72) Inventors: Valentins Ranetkins, Montreal (CA); Freddy Espinoza, Montreal (CA)

(73) Assignee: Vals Tech, Inc., Montreal, Quebec (CA)

( * ) Notice: Subject to any disclaimer, the term of this patent is extended or adjusted under 35 U.S.C. 154(b) by 287 days.

(21) Appl. No.: 14/839,042

(22) Filed: Aug. 28, 2015

(65) Prior Publication Data
US 2017/0060184 A1 Mar. 2, 2017

(51) Int. Cl.
| G06F 1/16 | (2006.01) |
| G03B 17/08 | (2006.01) |
| A45C 11/22 | (2006.01) |
| A45C 11/38 | (2006.01) |

(52) U.S. Cl.
CPC ........... *G06F 1/1628* (2013.01); *G03B 17/08* (2013.01); *A45C 11/22* (2013.01); *A45C 11/38* (2013.01); *G06F 1/1626* (2013.01); *G06F 2200/1633* (2013.01)

(58) Field of Classification Search
CPC ..................................................... A45C 11/22
See application file for complete search history.

(56) References Cited

U.S. PATENT DOCUMENTS

| 4,322,154 A | 3/1982 | Hashimoto et al. |
| 7,457,052 B2 | 11/2008 | Hirata |
| 8,519,286 B1 * | 8/2013 | Bloch ............... G06F 3/044 200/302.2 |
| 2009/0032420 A1 * | 2/2009 | Zenzai ............... G03B 17/08 206/316.2 |
| 2012/0154569 A1 | 6/2012 | Geddes |
| 2013/0082963 A1 | 4/2013 | Chu |
| 2013/0135759 A1 | 5/2013 | O'Neill |
| 2013/0177304 A1 | 7/2013 | Chapman et al. |
| 2015/0205186 A1 | 7/2015 | Park et al. |

(Continued)

OTHER PUBLICATIONS

The International Search Report and Written Opinion, dated Nov. 3, 2016, in the related PCT Patent Appl. No. PCT/CA2016/051001.

(Continued)

*Primary Examiner* — Clayton E Laballe
*Assistant Examiner* — Jas Sanghera

(57) ABSTRACT

A waterproof housing for a digital device includes front and rear bulkhead members for sealably holding a digital device having a touch screen. The touch screen is positioned to be viewed through a transparent surface of the rear bulkhead, which includes an aperture through which an actuator is sealably positioned. The actuator includes a shaft extending through the aperture, a control member connected to an outer end of the shaft, a stop member affixed to the control member for contacting the housing or engaging the recess, an extension member connected to an inner end of the shaft, a first probe affixed to the extension member near the shaft, and a second probe affixed to the extension member at an off-center position relative to a center axis defined by the shaft. The actuator is configured to selectively operate the first and second probes to execute touch motions on the touch screen."

16 Claims, 39 Drawing Sheets

(56) References Cited

U.S. PATENT DOCUMENTS

2015/0273365 A1  10/2015  Laverdiere et al.
2016/0124290 A1   5/2016  Bergreen et al.

OTHER PUBLICATIONS

The U.S. Office Action, dated Oct. 25, 2016, in the related U.S. Appl. No. 14/839,087.
Canon, EOS Rebel T3i Instruction Manual, Jan. 2011, pp. 1, 18, 23, 36, 37, and 324.

* cited by examiner

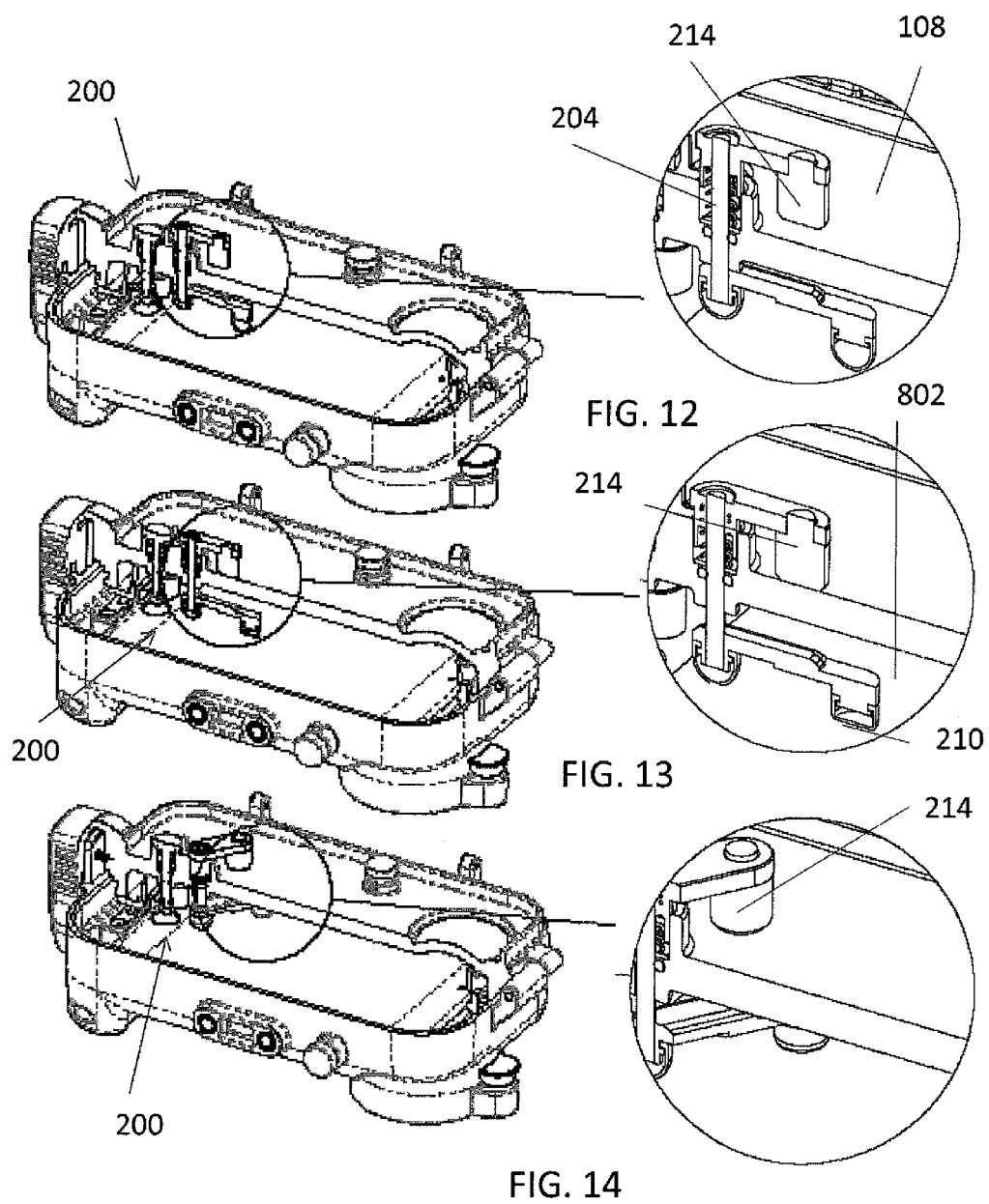

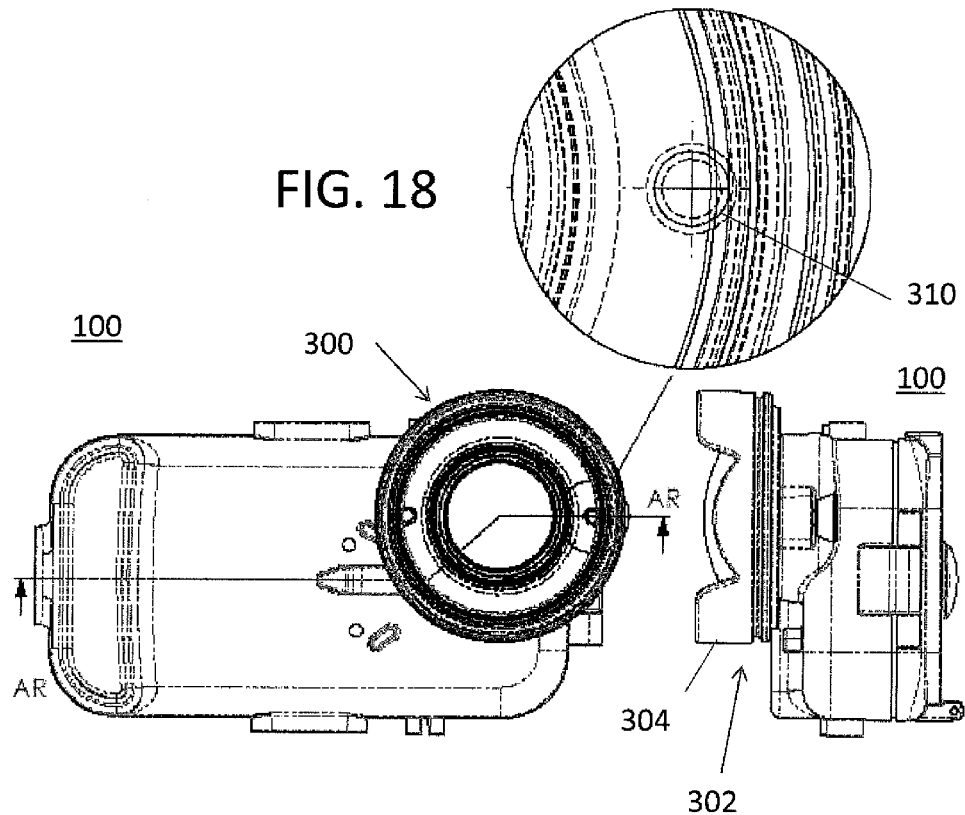
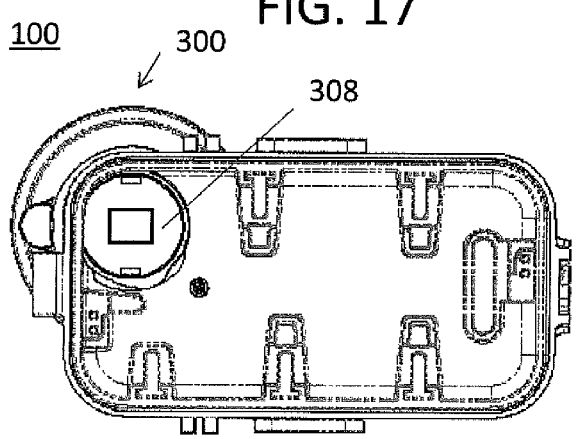
FIG. 18
FIG. 17
FIG. 19
FIG. 20

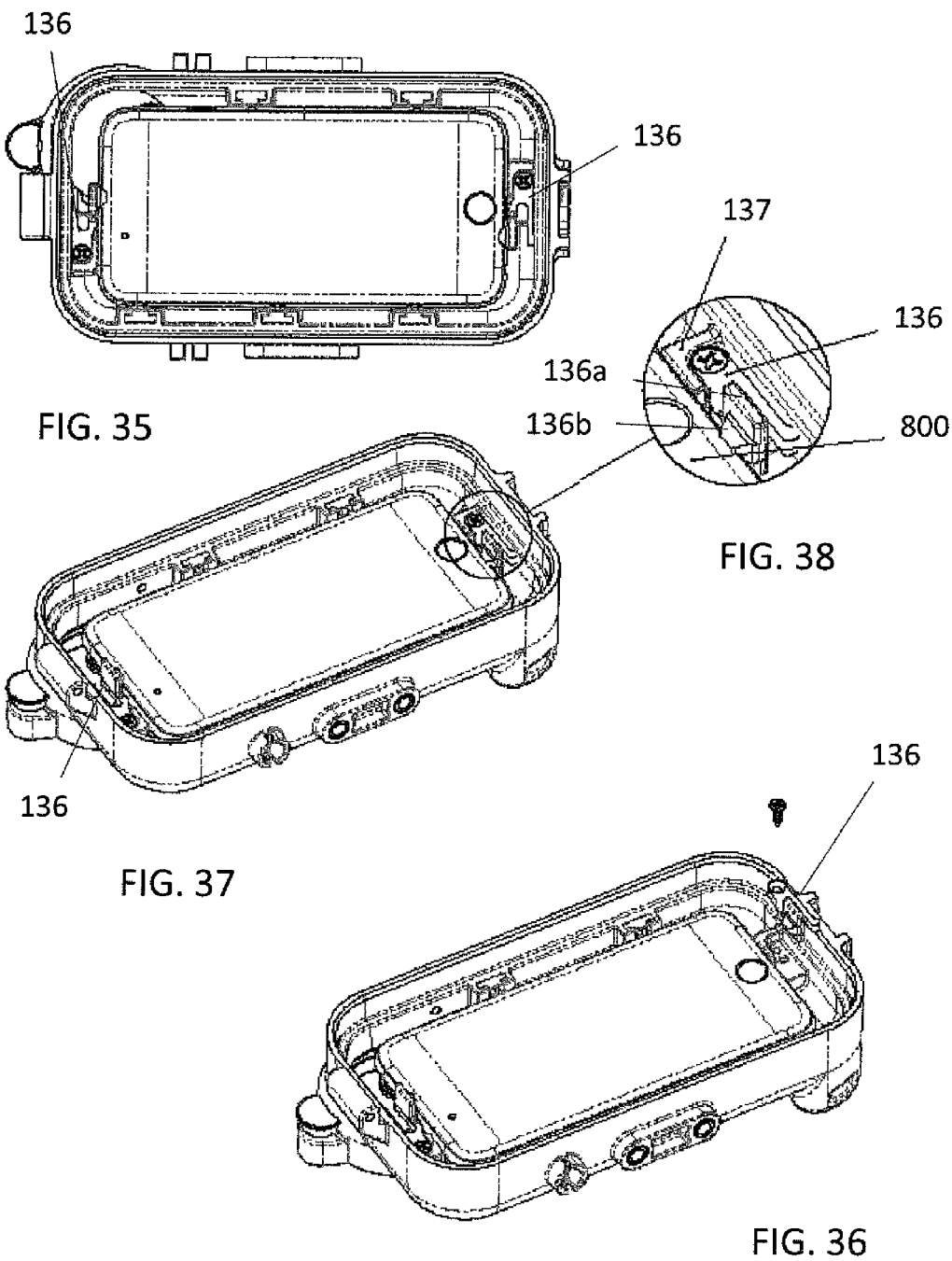

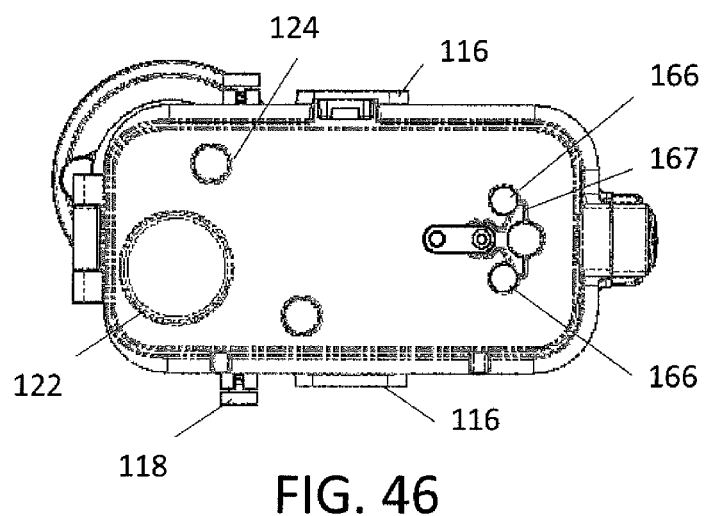
FIG. 46
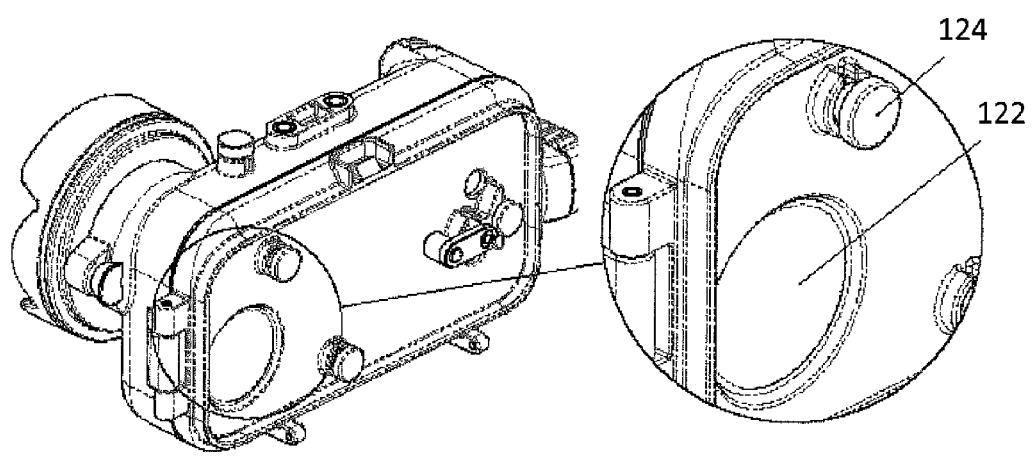
FIG. 47
FIG. 48

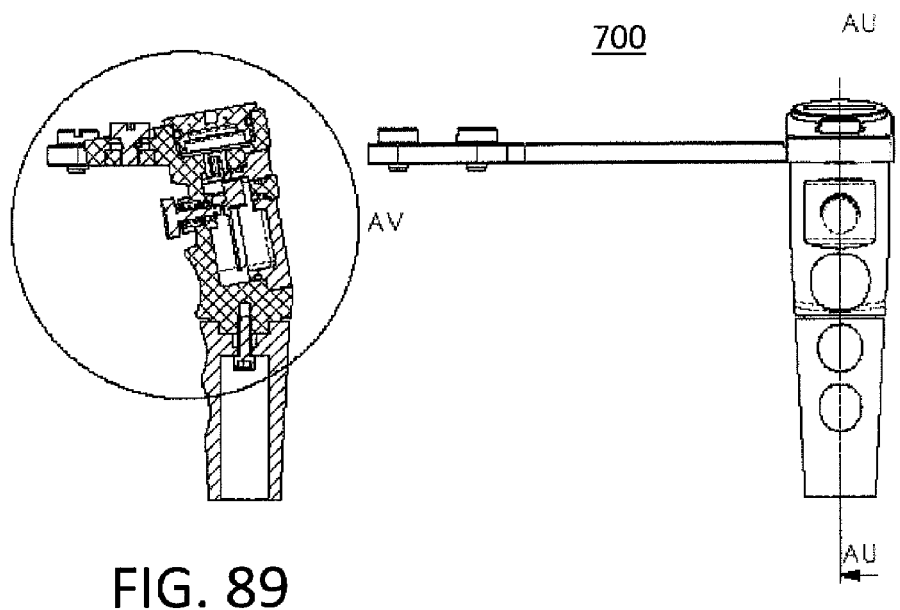
FIG. 89
FIG. 88
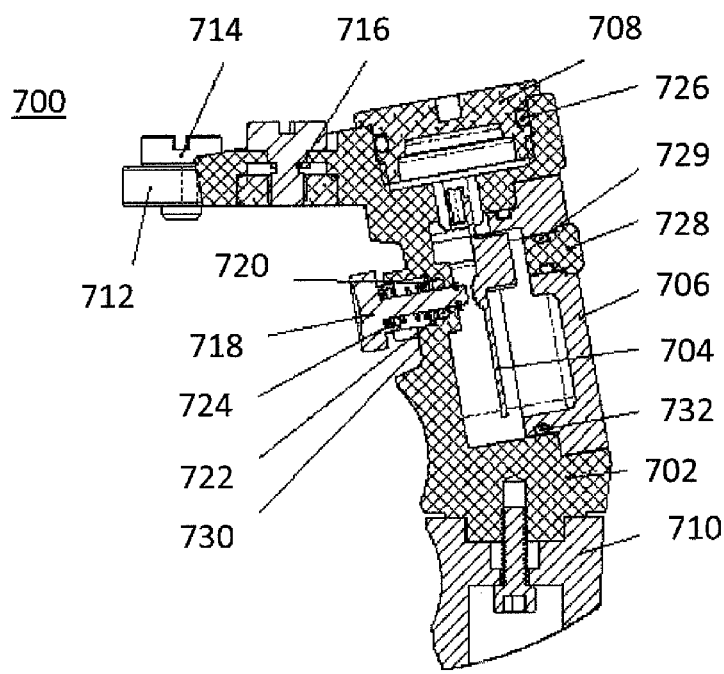
FIG. 90

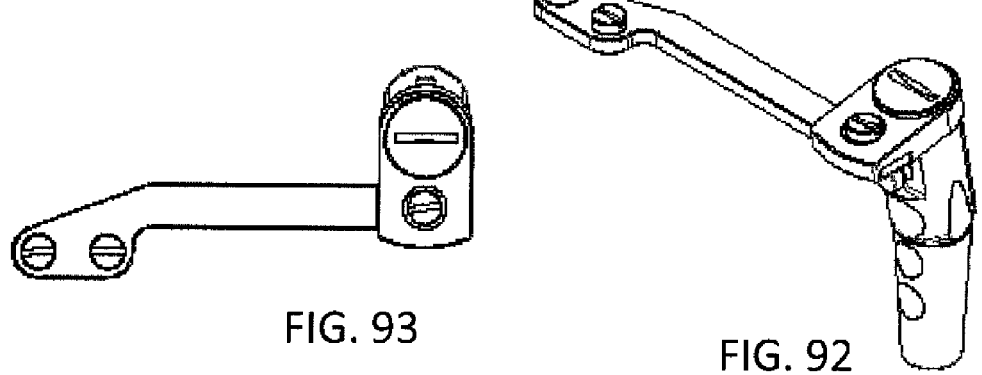
FIG. 93
FIG. 92
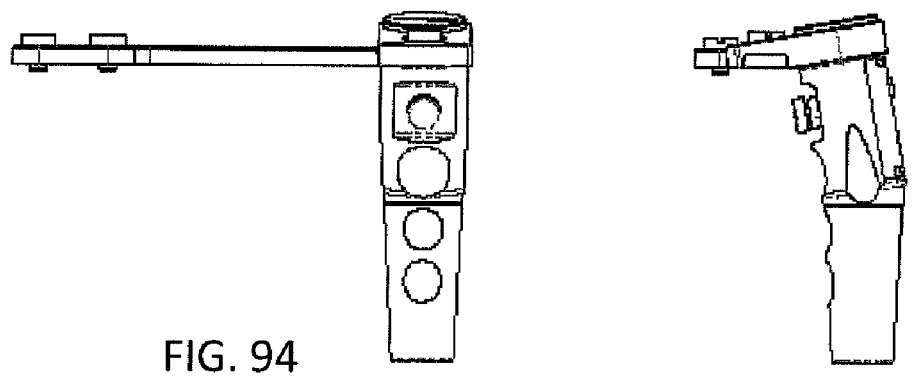
FIG. 94
FIG. 95

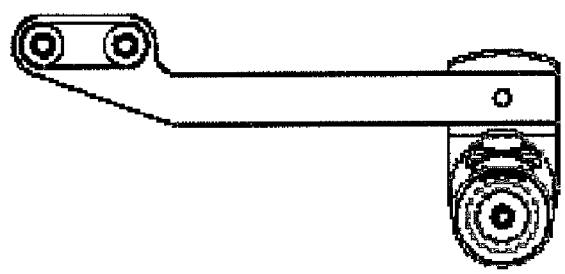
FIG. 96
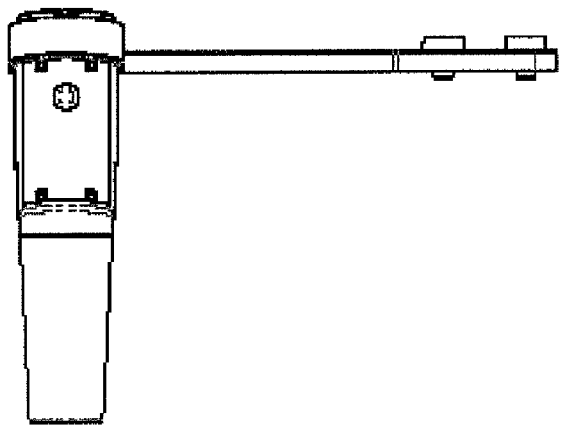 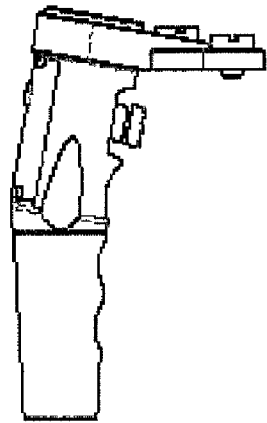
FIG. 97                    FIG. 98

WATERPROOF HOUSING WITH SWING ARM ACTUATOR FOR USE WITH DIGITAL DEVICES AND METHOD

RELATED APPLICATION

The present application is related to U.S. patent application Ser. No. 14/839,087, filed on Aug. 28, 2015 and entitled "Lens Mount System For Waterproof Camera Housing.

TECHNICAL FIELD

The present invention pertains to waterproof housings for digital devices having video and photograph capturing capabilities, and more particularly to improvements in such waterproof housings for operating the video and photograph capturing capabilities.

BACKGROUND

Improvements in the video and photograph capturing capabilities of digital devices including, for example, smart phones, tablet computers, phablets, and digital pocket cameras, have increased steadily with each new generation of such devices. Because of such improvements and the ease of use of such devices based on their large displays and touch-screens, an increasing number of users primarily rely on these devices for their video and photograph capturing needs. However, such devices are generally not useable under water or in wet conditions, which typically would cause irreparable damage.

As a result, several manufacturers have developed waterproof housings including, for example, LIFEPROOF cases available from Treefrog Developments, Inc. of Fort Collins, Colo. However, conventional waterproof housings for such devices do reasonably well for protecting such devices from water infiltration, but do little to take advantage of the advanced video and photograph capturing capabilities of such modern digital devices or enable the convenient use of a device's touch-screen for use of such advanced capabilities in challenging conditions such as underwater or in wet conditions. See, for example, U.S. Patent Application Publication No. 2013/0082963 directed to a waterproof housing for digital devices having basic push buttons disposed for contacting specific areas of a devices touch-screen or overtly simple and limited swing arm actuators for performing swipe operations on the touch-screen. Moreover, this published patent application teaches the use of a simple fixed transparent glass lens located on the housing proximate an optical sensor of the digital device, which permits disadvantageous amount of extraneous light to contact and adversely effect captured video and photographs as well as disregards the optical needs for underwater photograph.

Likewise, the proposed solution disclosed in U.S. Patent Application Publication No. 2012/0154569 of a waterproof housing having a control arm extending therethrough with a rubberized tip to operate the touch-screen would prove to be exceedingly difficult to use underwater or provide unstable operation such as when canoeing or kayaking.

Correspondingly, waterproof housings for single-lens reflex ("SLR") cameras are known but use camera specific controls that are not typically useable for controlling touch-screens. See, for example, the multi-directional pad for an underwater camera housing described in U.S. Pat. No. 8,787,745 that utilizes a complex level system to achieve control of camera dial pads, which are not readily analogous to touch-screen controls.

Accordingly, known waterproof housings prove to be very limited in enabling a user to take advantage of the advanced video and photograph capturing capabilities of modern digital devices, or in enabling convenient use of a device's touch-screen to utilize of such advanced capabilities systems in adverse conditions. Moreover, such waterproof housings further fail to provide any teachings with regard to advantageous and cost-effect systems for providing interchangeable lens or light filters required by avid photographers and videographers.

SUMMARY

Briefly, aspects of the present disclosure are directed to a waterproof housing for a digital device. The housing incorporating many improvements, individually or in combination, that enable a user to take advantage of the advanced video and photograph capabilities of such devices, including operating a device's touch-screen using an advantageous multi-touch swing arm actuator; low-cost interchangeable lens systems with light blocking masks, systems for switching light filters without the need for opening the housing; and an improved latching mechanism for closing and sealing the housing.

In particular, aspects of the present disclosure are directed to the multi-touch swing arm actuator of the water proof housing. In an exemplary embodiment of the multi-touch swing arm actuator, a shaft of the actuator is disposed within an aperture formed within the housing. The housing further includes at least one recess formed therein for positioning proximate a touch screen of a digital device when said digital device is positioned within the housing. The actuator comprises the shaft, a control member connected to an outer end of the shaft, a stop member affixed to one of the shaft or the control member for contacting the housing or engaging said recess, an extension member connected to an inner end of the shaft, and first and second probes affixed directly or proximate to the extension member. The first probe is positioned proximate the shaft and the second probe is compressible and located at an off-center position relative to a center axis defined by the shaft. Outer surfaces of the first and second probes respectively terminate at first and second positions along a direction of the center axis of the shaft; with the second position along the center axis being distally further from the control member than the first position.

In operation, the control member is operable to rotate the extension member about the center axis of the shaft along an arcuate path defining a first radial segment and to urge the second probe to contact the touch screen to carry out a screen touch or "touch-swipe" motion across the touch screen. Correspondingly, when the extension member is within the first radial segment, the stop member is operable to engage an outer surface of the housing and prevent the first probe from contacting the touch screen. However, when the extension member is at a predetermined position outside of the first radial segment at which the second probe is not positioned over a portion of the touch screen, the stop member is operable to engage the recess of the housing, thereby permitting the control member to urge the first probe member to contact the touch screen. Also, with the second probe not being positioned over a portion of the touch screen, the second probe compresses as needed to further enable the first probe member to contact the touch screen.

A corresponding exemplary method in accordance with this aspect of the invention comprises (i) positioning a shaft of the actuator to extend through an aperture in the housing with the housing having at least one recess formed therein proximate a touch screen of the digital device when said digital device is positioned within the housing; (ii) configuring the actuator to comprise the shaft; a control member connected to an outer end of the shaft, a stop member affixed to one of the shaft or the control member for contacting said housing or engaging said recess, an extension member connected to an inner end of the shaft, a first probe affixed to the extension member proximate said shaft, and a second probe affixed to the extension member at an off-center position relative to a center axis defined by the shaft; (iii) disposing the first and second probes in the housing such that outer surfaces of the first and second probes respectively terminate at first and second positions along a direction of the center axis of the shaft; with the second position along the center axis being distally further from the control member than the first position; (iv) forming at least a portion of the second probe proximate its outer surface with a compressible material; (v) configuring the control member to further enable a user to rotate the control member to rotate the extension member about the center axis of the shaft along a circular path defining a first radial segment and to urge the second probe to contact the touch screen for carrying out a screen touch or a "touch-swipe" motion across the touch screen, and (vi) configuring the stop member to (a) engage an outer surface of the housing and prevent the first probe from contacting the touch screen when the extension member is within the first radial segment; and (b) engage the recess of the housing when the extension member is at a predetermined position outside of the first radial segment to thereby permit the control member to urge the first probe member to contact the touch screen.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect." The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIGS. 12-16 each provide paired exploded rear perspective and magnified exploded rear perspective views that illustrate an operational sequence for the swing arm actuator assembly of FIGS. 10 and 11;

FIGS. 17 and 18 respectively provide a front view and magnified front view of the waterproof housing of FIGS. 1 and 2 that illustrate a lens mount for a lens apparatus;

FIGS. 19 and 20 respectively provide left side and rear views of the waterproof housing of FIGS. 1 and 2 that illustrates a mount for a lens apparatus a lens apparatus mounted on the lens mount of FIGS. 17 and 18;

FIG. 35 provides an open rear view of the waterproof housing of FIGS. 1 and 2 that illustrates retention members used to retain a digital device within the housing;

FIG. 36 provides an exploded perspective view of the housing and retention members of FIG. 35;

FIGS. 37 and 38 respectively provide a perspective and magnified perspective view of the housing and one retention member of FIG. 35;

FIG. 46 provides a rear view of the waterproof housing of FIGS. 1 and 2;

FIGS. 47 and 48 respectively provide a perspective and magnified perspective view of the housing of FIG. 46 that illustrates a rear camera dome and selection button assembly of the housing;

FIG. 88 provides a front view of an exemplary grip component of the waterproof camera housing of FIG. 51 in accordance with another aspect of the disclosure;

FIGS. 89 and 90 respectively provide a sectional view and magnified sectional view in cut-a-way along the line AU-AU of FIG. 88;

FIG. 92 provides a front perspective view of the grip component of FIG. 88;

FIGS. 93-98 respectively provide top, front, right side, bottom, rear and left side views of the grip component of FIG. 92;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

We now provide some non-limiting, illustrative examples that illustrate operational and structural aspects of a waterproof housing for a touch-screen digital device.

As used herein, directional terms as may be used such as "horizontal," "vertical," "proximal," "distal," "front", "rear", "left," "right," "inner," "outer," "interior" and "exterior" relate to an orientation of the disclosed mixing device from the perspective of a typical user, and do not specify permanent, intrinsic features or characteristics of the device.

Figure 1:
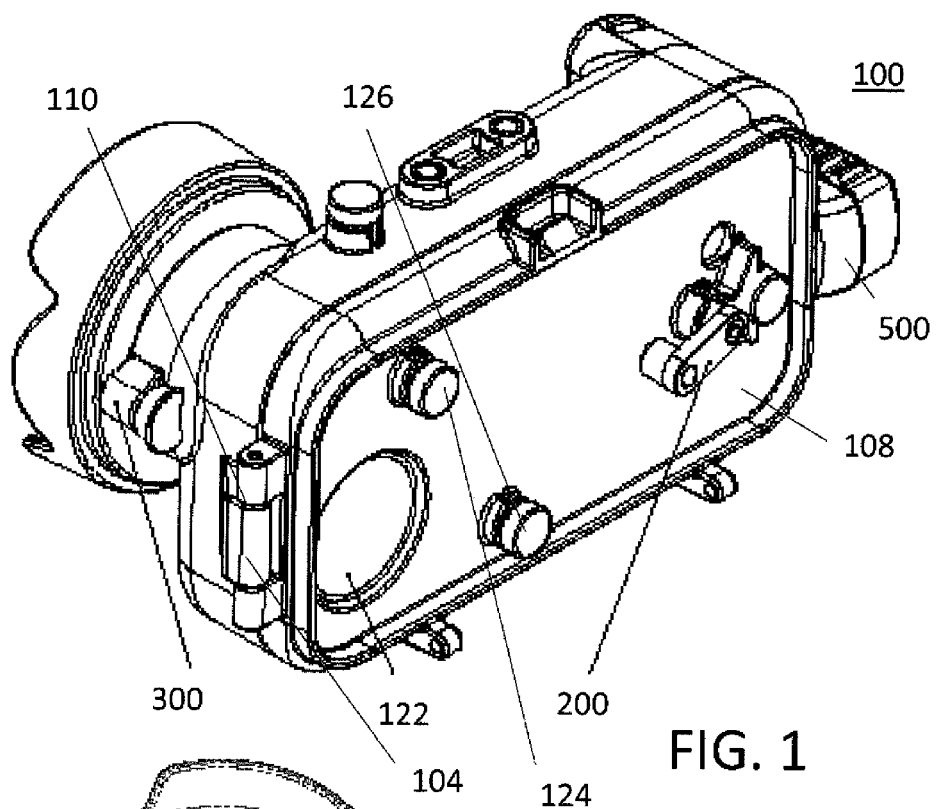
FIGS. 1 and 2 respectively provide front and rear perspective views of an exemplary waterproof housing according to aspects of the present disclosure.
Figure 2:
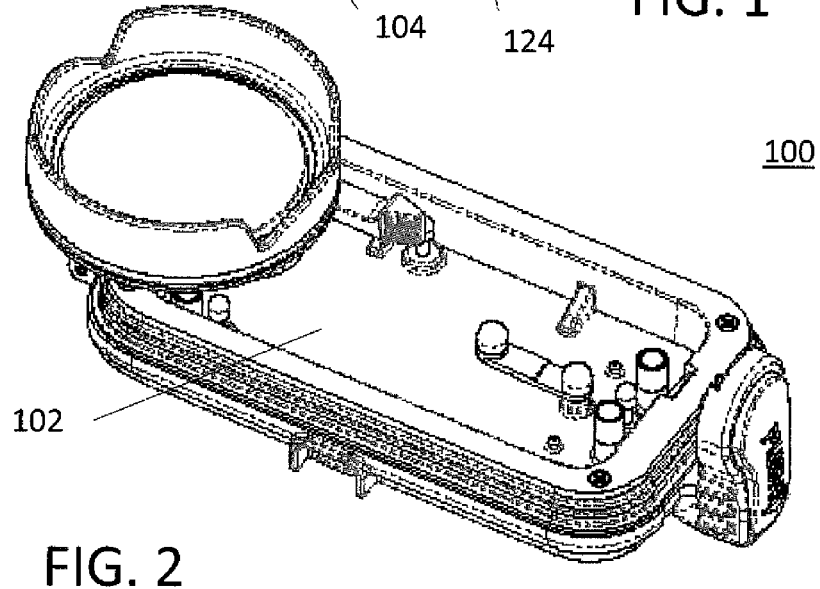
Figure 3:
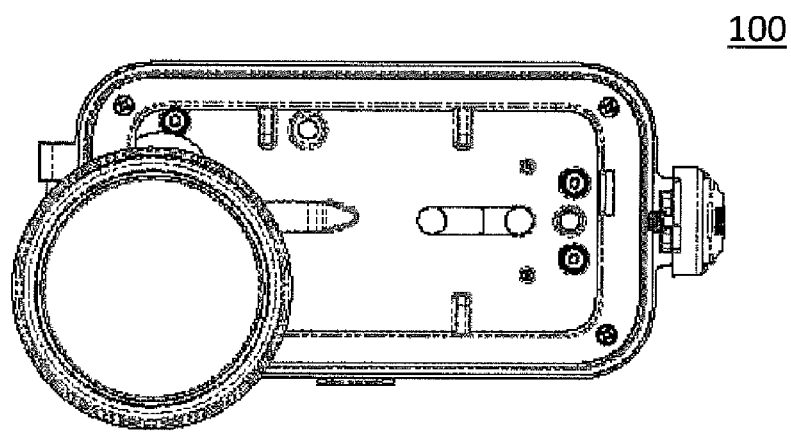
FIGS. 3-8 respectively provide front, top, rear, right side, left side and bottom views of the waterproof housing of FIGS. 1 and 2.
Figure 4:
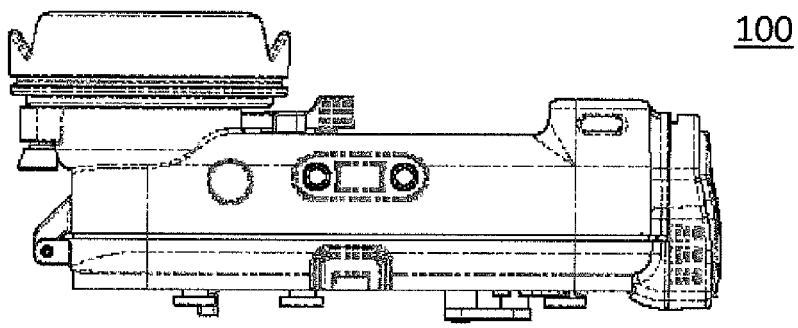
Figure 5:
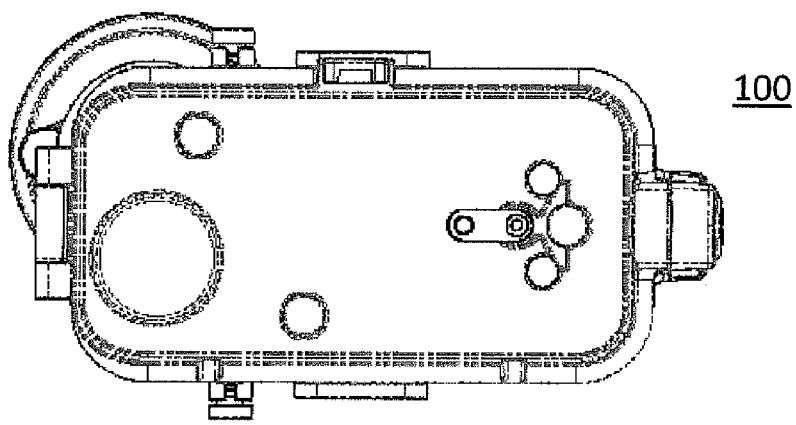
Figure 6:
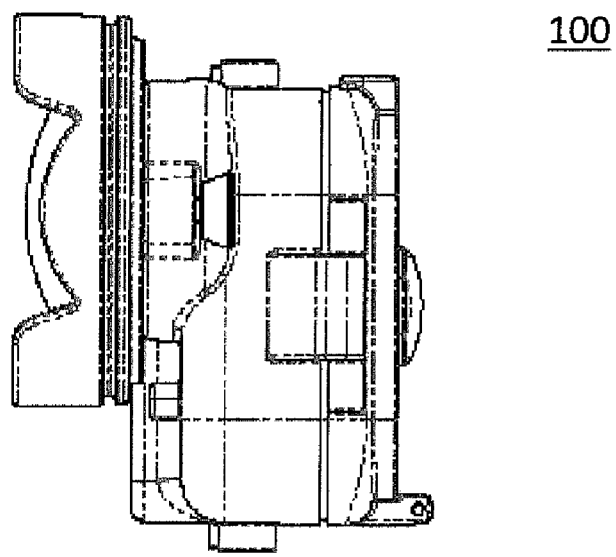
Figure 7:
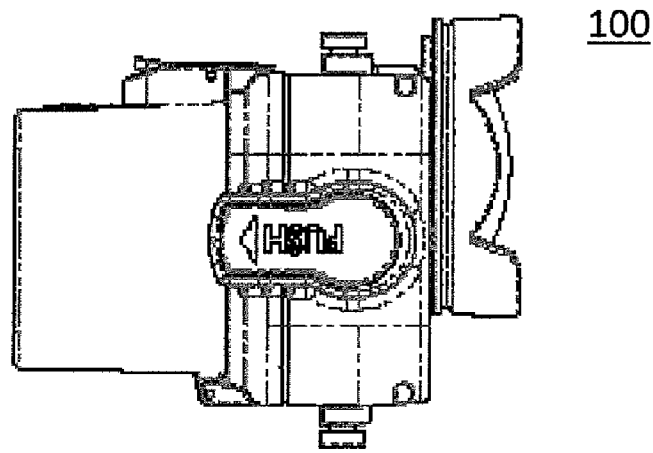
Figure 8:
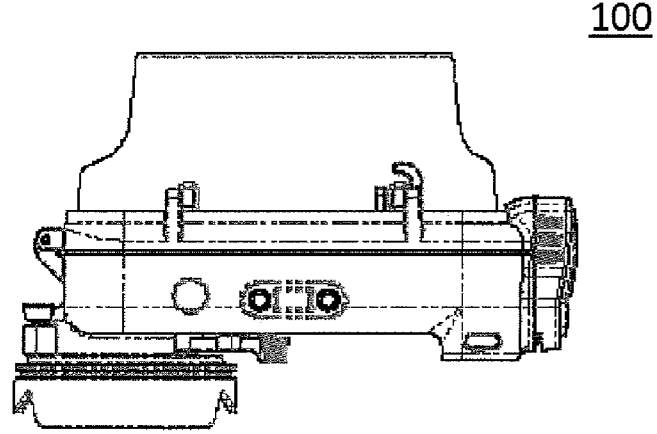

In accordance with aspects of the present disclosure, FIGS. 1 and 2 respectively provide rear and front perspective views of a waterproof housing 100 for a touch-screen digital device. As illustrated, the device includes front and rear bulkhead members 102, 108 that are respectively coupled by hinge members 104, 110 in combination with a latch 500. The front and rear bulkhead members 102, 108 may thereby be opened to receive a touch-screen digital device, and then closed in a secure manner to enclose the touch-screen digital device in a waterproof environment.

The housing 100 further includes an actuator assembly 200, which may be manipulated by an operator to carry out certain touch screen operations for operating camera or video features of the digital device while the digital device is enclosed within the front and rear bulkhead members 102, 108. The elements and operation of the actuator assembly 200 are described in further detail infra.

The housing 100 also features an interchangeable lens assembly 300 for optically communicating with a front-facing camera of the digital device, and a rear-facing camera dome 122 for optically communicating with a rear-facing camera of the digital device. As shown in FIGS. 1 and 2, these features are respectively configured in the housing 100 for the front-facing and rear-facing cameras of a digital device, such an IPHONE 6 smart phone, available from Apple, Inc. of Cupertino, Calif. The operator may select either of the front-facing and rear-facing cameras for use by means of a camera selection button assembly 124. An app selection button assembly 126 may also preferably be provided for selection of an associated smart phone application (for example, a still camera or video camera application) that is provided at a designated position on the IPHONE 6 screen. The elements and operation of these features are also described in further detail infra.

The description herein of the advantageous waterproof housing useable with an IPHONE 6 is for illustration purposes only. It should be readily understood that aspects of the disclosure may be readily adapted for use with any digital device having a camera optical sensor and a touch sensitive screen including, for example, other commercially available smart phones, tablet computers, phablets such as those manufactured by Motorola, Samsung, LG, HTC, Google, Microsoft Corporation, Nokia and the like.

FIGS. 3-8 respectively provide front, top, rear, right side, left side and bottom views of the waterproof housing 100 illustrated by FIGS. 1 and 2.

Figure 9:
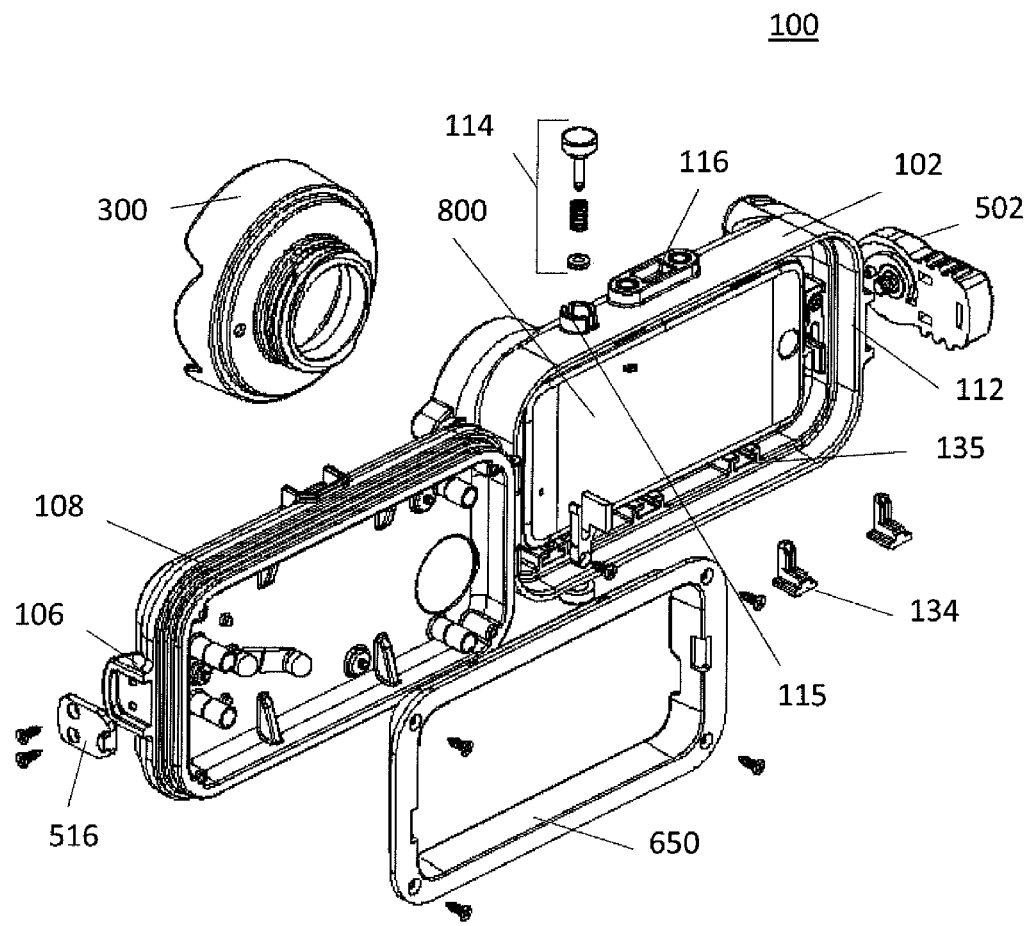
FIG. 9 provides an exploded rear perspective view of the waterproof housing of FIGS. 1 and 2.

FIG. 9 provides an exploded rear perspective view of the housing 100 of FIGS. 1 and 2, showing the front bulkhead 102 and rear bulkhead 108 in an open position. A digital device 800 (for example, and IPHONE 6 smart phone) is positioned within an interior cavity of the front bulkhead 102, with the touch screen of the digital device 800 facing rearwardly. As depicted in FIG. 9, side pads 134 are insertable into holders 135 for providing a cushioned clamping effect to the digital device 800 when the front bulkhead 102 and rear bulkhead 108 are returned to a closed position. Side pads 134 may preferably be formed from an elastomeric material such as natural rubber or neoprene. The front bulkhead 102 may preferably be formed from a ragged plastic material including but not limited to polypropylene, low density polyethylene (LDPE), high density polyethylene (HDPE) or acrylonitrile butadine styrene (ABS). Most preferably, the front bulkhead 102 is formed from an ABS material. The rear bulkhead 108 may be preferably formed from a transparent plastic, for example including one or more of polycarbonate, polystyrene or another acrylic plastic. Use of a clear transparent plastic material, for example, enables the rear bulkhead (including the rear-facing camera dome 122 of FIG. 1 to be molded in a single piece. Most preferably, the rear bulkhead 108 is formed from a XYLEX polycarbonate and amorphous polyester blended resin, such as is available from SABIC Innovative Plastics of Pittsfield, Mass.

At ends of the front bulkhead 102 and rear bulkhead 108 opposite to the hinge members 104, 110, front bulkhead latch scat member 112 and rear bulkhead latch seat member 106 are provided to support components of the latch 500. For example, as depicted in FIG. 9, extended latch strike 516 of the latch 500 is insertable into the seat member 106 to be retained by several screws. Alternatively, the extended latch strike 516, which is preferably formed from a metal such as stainless or anodized steel, may be attached to the latch seat member 106 by means of metal or plastic rivets, adhesives, and/or frictional fit, As further depicted for example in FIG. 7B, a latch body 502 of the latch 500 is attached to seat member 112 via retainer screw 508, which may be inserted into a molded threaded feature of the seat member 112 or a screw insert that is pressed or threaded into the seat member 112.

A top button assembly 114 (preferably including a button member, a spring and an o-ring) is preferably fitted to a top button cylinder 115 for operating a side button of the digital device 800 (for example, the on/off button of an IPHONE 6 smart phone). As will be further described infra, a tripod/grip mount 116 is preferably mounts in proximity to the top button assembly on a top surface of the front bulkhead 102 for receiving a grip, tripod or other accessory to the housing 100. Also illustrated in FIG. 9 is a light mask 650, which is optionally fitted into an interior cavity of the rear bulkhead 108. The light mask 650 is preferably formed from an opaque (black) plastic, and affixed to the rear bulkhead 108 by screws, plastic or metal rivets, adhesives and/or snap-fit features. The light mask 650 is preferably provided when one or more of the front bulkhead 102 and rear bulkhead 108 are formed from a transparent material in order to advantageously shield the touch-screen from stray light that may obscure its visibility to the operator.

Figure 11:
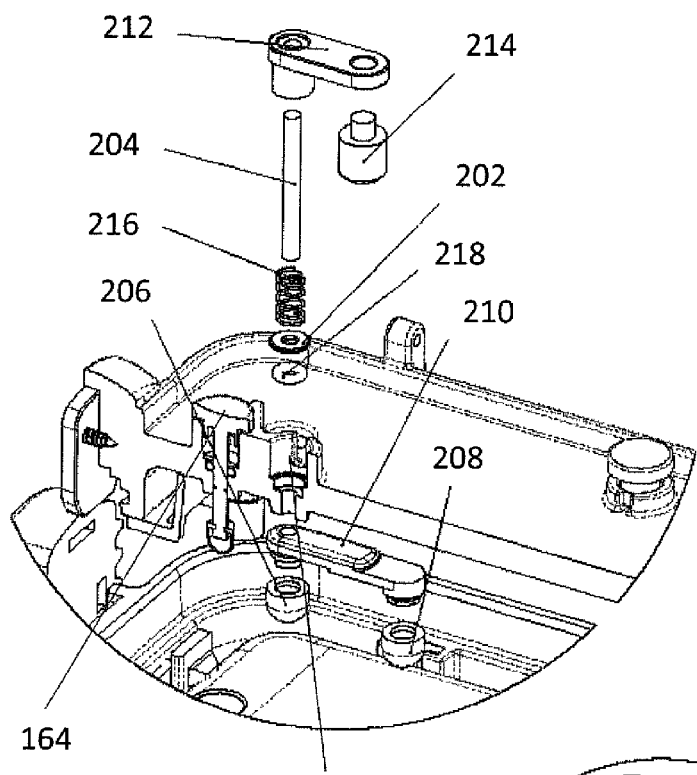
FIGS. 10 and 11 respectively provide an exploded rear perspective view and magnified exploded rear perspective view that illustrates an exemplary swing arm actuator assembly according to aspects of the present disclosure.
Figure 10:
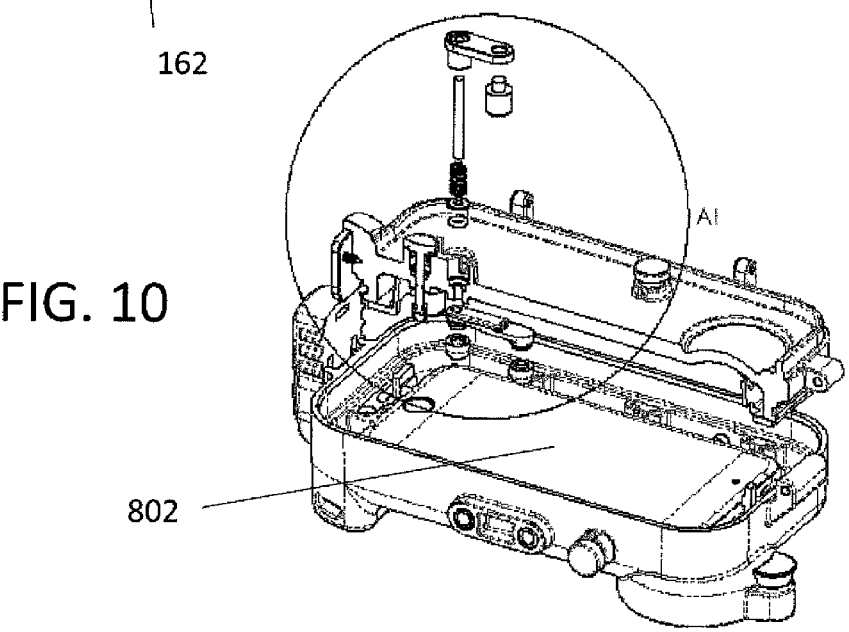

FIGS. 10 and 11 respectively provide an exploded rear perspective view and magnified exploded rear perspective view that further illustrate the actuator assembly 200 of FIG. 1, which is used by an operator to operate features of the touch screen of digital device 800 that are needed to engage one or more of the cameras of the digital device 800. With reference to FIG. 11, actuator assembly 200 is mounted to the rear bulkhead 108 of the housing 100 in an actuator assembly cylinder 162. The assembly 200 includes a shaft 204 and a control member 212 connected to an outer end of the shaft 204. A stop member 214 is affixed to the control member 212 for engaging an outer surface of the rear bulkhead 108 in order to limit the downward vertical position of the actuator assembly 200 as operated by the operator. One of skill in the art will readily recognize that the stop member may alternatively be incorporated in the actuator assembly 200 in a number of other ways, for example including by direct attachment via a securable collar to the shaft 204.

As assembled, the control member 212 and stop member 214 are positioned externally to the housing, while the shaft 204 extends externally from the control member 212 through the cylinder 162 into an interior cavity of the rear bulkhead 108. Also fitted in the actuator assembly cylinder 162 and encircling the shaft 204 are a biasing spring 216, o-ring 218 and o-ring retainer washer 202. In response to a downwardly-directed operation of the control member 212, the biasing spring 216 provides a restorative force for returning the actuator assembly 200 upwardly to a rest position when the control member 212 is released by the operator. The o-ring 218 is retained in the cylinder 162 by the o-ring retainer washer 202, and provides a waterproof seal between the shaft 204 and the cylinder 162.

Further included in the actuator assembly 200 and positioned within the interior cavity of the rear bulkhead 108 is an extension member 206 connected to an inner end of the shaft 204. A first probe 208 is affixed to the extension member 210 near the inner end of the shaft 204. A second probe 210 is affixed to the extension member 210 at an off-center position relative the shaft 204. The first and second probes 208, 210 are each preferably formed from a compressible elastomeric material (for example, such as natural rubber or neoprene) and covered with a fine metallic mesh material, such as is used for example in .ARCADIA stylus pens available from New Trent Inc. Fremont Calif.

As can be seen for example with reference to FIG. 11. the extension member 210 is stepped such that the outer surface of second probes 210 terminates at a lower vertical position that the outer surface of the first probe 208. In this configuration, control member 212 can be simultaneously operated by an operator to rotate the extension member 206 about the center axis of the shaft 204 along a circular path defining a first radial segment while urging the second probe 210 to contact the touch screen 802 of the digital device 800, thereby carrying out a "touch-swipe" motion across the touch screen 802. Such a touch swipe may be used, for example, to select a camera or video mode for a camera application resident on an IPHONE 6 smart phone.

As described supra, the stop member 214 of the actuator assembly 200 is configured to engage an outer surface of the rear bulkhead 108 in order to limit the downward vertical position of the actuator assembly 200. More specifically, in this context, the stop member 214 is generally operable when the extension member 210 lies within a first radial segment to engage an outer surface of the rear bulkhead 108 at a vertical height of the shaft 204 that allows the second probe 210 to compressibly contact the touch screen 802 while preventing contact between the first probe 208 and the touch screen when the extension member is within the first radial segment to engage an outer surface of the housing and prevent the first probe to contact the touch screen. As will be further described with reference to FIGS. 15 and 16, When the extension member 206 is moved outside the limits of the first radial segment to a position where the second probe 210 is either not vertically positioned over a portion of the touch screen 802 or alternatively positioned over a portion of the touch screen that is not touch activated for purposes of the camera application, the stop member 214 can be positioned to align with a recess 166 in the outer surface of the rear bulkhead 108 that enables the actuator assembly 200 to travel further downwardly in the vertical direction. Because the second probe 210 is compressible, an operator can operate the control member 212 while the stop member is in the recess position to cause the first probe to contact the touch screen 802 (for example, to activate a shutter button displayed on the touch screen for a camera application resident on an IPHONE 6 smart phone). As depicted in FIG. 11, a home button actuator 164 is preferably positioned on the outer surface of the rear bulkhead 108 in proximity to the actuator assembly, and may be operable for example to actuate a home button adjacent to the touch screen of the IPHONE 6.

FIGS. 12-16 each provide paired exploded rear perspective and magnified exploded rear perspective partial cut-a-way views that further illustrate the operation of the actuator assembly 200 described supra. In FIG. 12, the actuator 200 can be seen within the first radial segment at a rest position, in which the shaft 204 is at its highest vertical extent and the stop member 214 is resting above the outer surface of the rear bulkhead 108. In FIG. 13, the control member 212 has been moved vertically downwardly until the second probe 210 has contacted and been compressed by the touch screen 802 of the digital device 800. IN FIG. 14, the control member 212 and stop member 214 have been rotated in a counter-clockwise direction about the shaft 204, thereby generating a touch swiping motion.

Figures 15, 16:
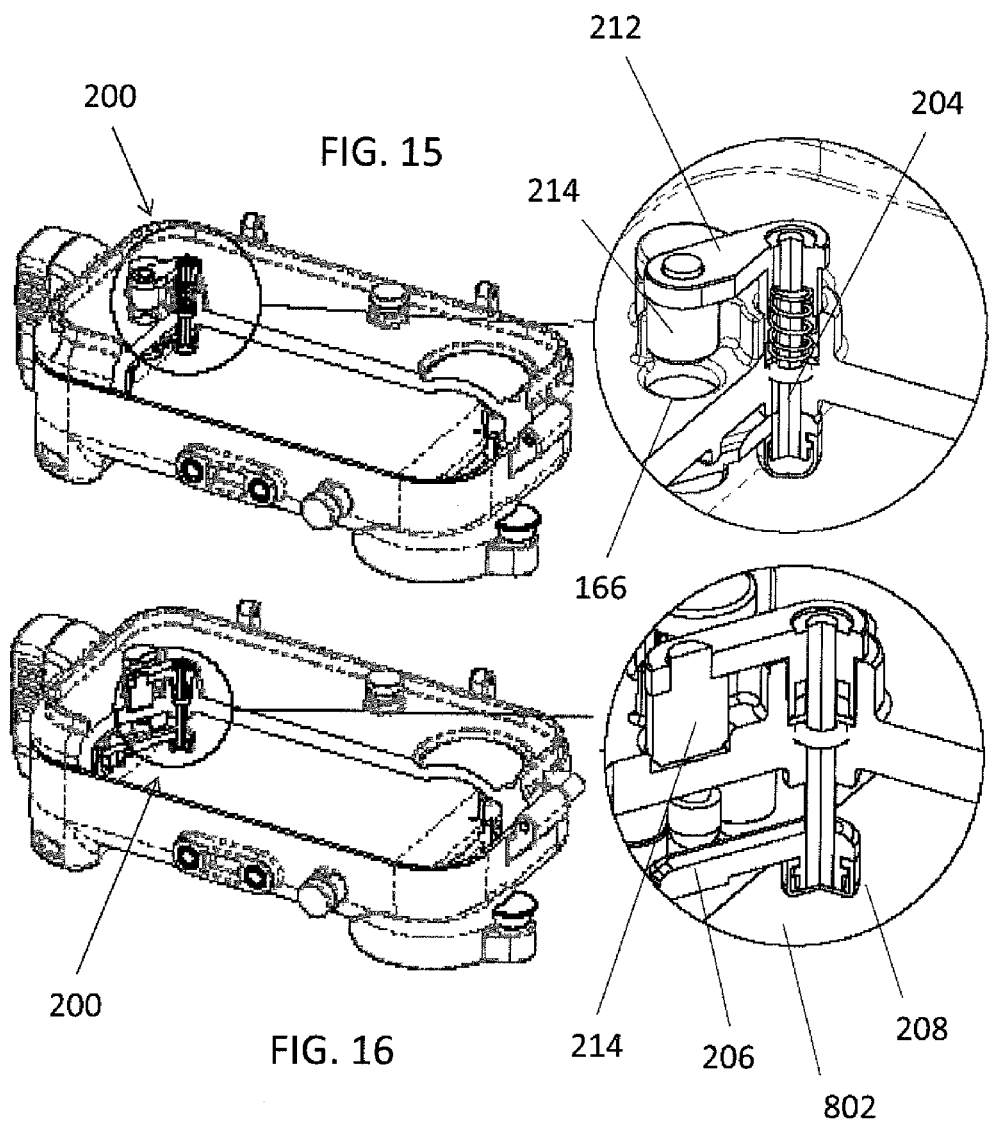

In FIG. 15, the control member 212 and stop member 214 have been rotated in a clockwise direction to position the stop member 214 vertically over a recess 166 in the outer surface of the rear bulkhead 108, such that the first probe 208 is positioned away from active portions of the touch screen 802. In FIG. 16, the control member 212 has been pressed to move the shaft 204 vertically downwardly so that the stop member 2.14 enters the recess 166, thereby enabling the second probe 210 to contact and be compressed against the touch screen 802.

The previously described figures depict one exemplary configuration of the actuator 200 in accordance with the invention for illustration purposes only. However, it should be readily understood that many other configurations are easily adapted from this exemplary configuration for an actuator according to the principles of the disclosed invention. For example, the control member 212 and/or extension member 210 may have different shapes including one or more bends or curves (for example, such as an shape) according to an alternative configuration. Other suitable control member configurations useable for the control member 212 may for example include external gripping features formed integral with or affixed to the shaft including, for exampled, a knurled region at the outer end of the shaft.

In addition, the operations of the stop member 14 may be separated from the control member 212. In such embodiments, the stop member 214 may alternatively be disposed on a short extension from or directly attached to the shaft 205 at a predetermined distance from the outer surface of the rear bulkhead 108, and the control member 212 may be implemented as a disk or other shaped extension or omitted entirely. Correspondingly, in such an embodiment, a slot or recess disposed in the outer surface of the rear bulkhead 108 proximate near the shaft 204 may replaceably perform the functions of the recess 166.

Also, the corresponding operation of the camera or video-capture application running on the digital device may dictate an alternate location of the first and second probes 208 and 210a. Thus, for example, in other alternative embodiments of the disclosed invention, the first probe 206 may be disposed on the extension member 206 off-center relative to the shaft 204, or the positions of the first and second probes 208 and 210 may be switched, wherein the second probe 210 is disposed on the extension member 206 closer to the center-axis of the shaft 204.

Further, the second probe 210 may be operated to activate different features by touching the screen discretely to contact particular icons or displayed buttons in addition to performing a "touch swipe." Moreover, the extension member 206 may further include one or more additional probes (not shown) similar to probe 208 for performing or emulating with the probe 210 a multi-finger "touch swipe" operation. Also, consistent with aspects of the present disclosure, the extension member may include an adjustment mechanism such as, for example, a slot (not shown) to enable re-positioning of either or both of the probes 208 and 210 to accommodate different camera and video capture software and applications with different locations for the activations of particular features or shutter control.

FIGS. 17-22 illustrate elements of a removable lens apparatus 300 that forms a component of the housing 100 in accordance with another aspect of the present disclosure. FIGS. 17, 19 and 20 respectively provide front, left side and rear views of the housing 100 with the lens apparatus 300 mounted to the housing. FIG. 18 presents a magnified view of a portion of the lens apparatus 300 illustrated in FIG. 17. As illustrated in FIGS. 17 and 19, lens apparatus 300 includes a housing 302 for carrying the dome port lens, which preferably includes a light shade 304 that provides glare protection and a surface which the operator can grab to mount or dismount the lens apparatus 300.

As illustrated in FIGS. 19-20, the lens apparatus may be secured positioned in an aperture through an outer surface of the front bulkhead 102 (for example, by means of mating threads provided on each of the body of the dome port housing 302 and within the aperture through the front bulkhead 102). On an end surface of the lens apparatus, a mask frame 308 is preferably provided to reduce the amount of light glare presented through the housing 100 to a corresponding front camera in the digital device 800. FIG. 18 illustrates a seat 310 that is provided in a flanged surface of the housing 302 that mates with a corresponding surface on the surface of the front bulkhead 102 when the lens apparatus 300 is mounted to the housing 100. The seat 310 is configured to receive the tip of a locking pin 144 provided in the front bulkhead 102, which is further described infra.

Figure 21:
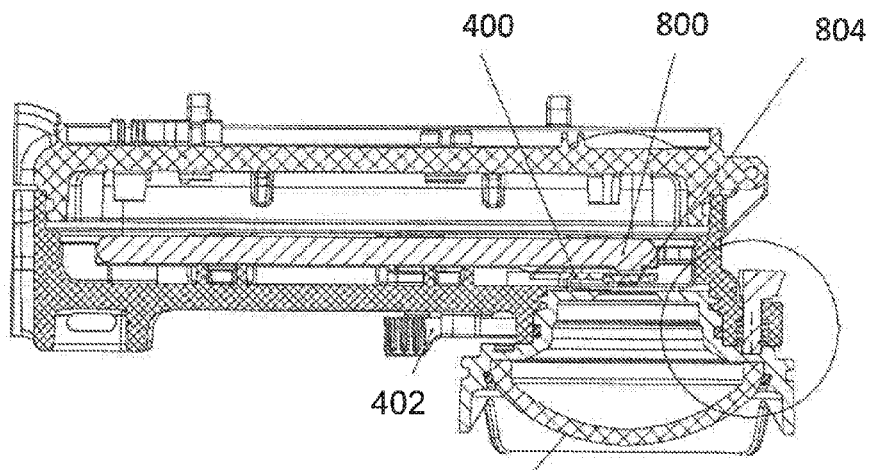
FIGS. 21 and 22 respectively provide a top sectional view and a magnified top sectional view taken along line AR-AR of FIG. 17.
Figure 22:
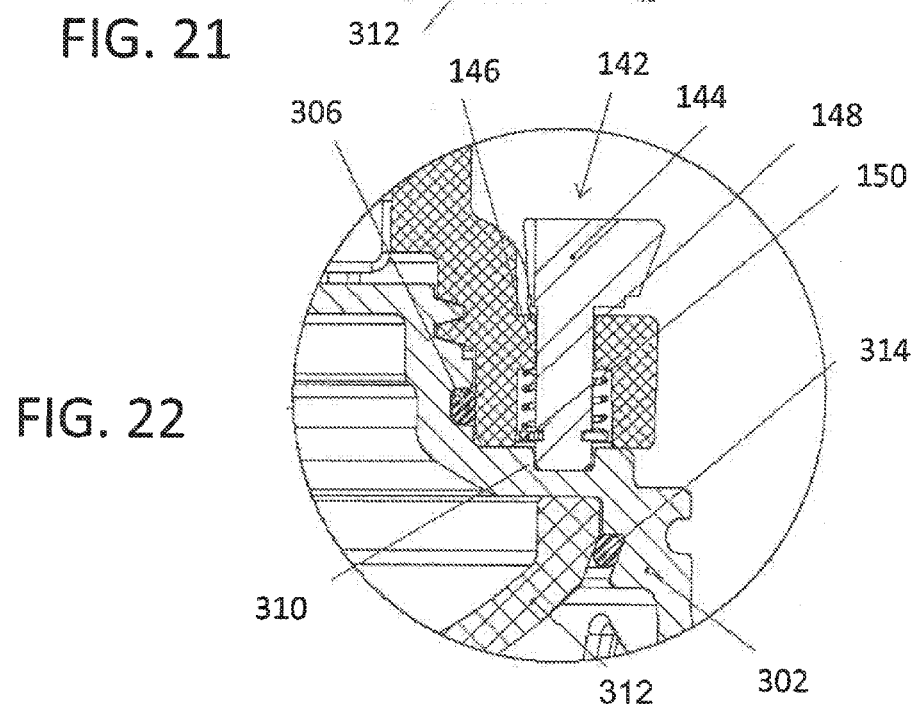
Figure 25:
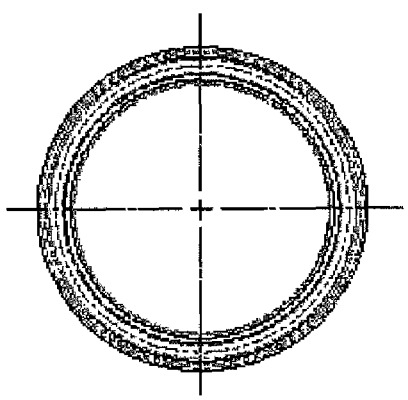
FIGS. 25-28 respectively provide top, bottom, front/rear and left/right side, views of the lens apparatus of FIGS. 23 and 24.

FIGS. 21 and 22 respectively provide a top sectional view and a magnified top sectional view of the housing 100 lens apparatus 300 of FIG. 17, taken along line AR-AR of FIG. 17. As depicted in FIGS. 21 and 22, an optical dome 312 is fitted, secured and sealed to the housing 302 by means of an o-ring 314. The housing 302, including the light shade 304 and mask frame 308 are preferably formed from an opaque plastic for example such as polypropylene. Optical dome 312 is formed from a clear, transparent plastic such as polycarbonate. The domed shape of the optical dome 312 is advantageously used in underwater environments in combination with the front camera of the digital device 800 for improved light balance and proportional rendering of images.

The dome port housing 302 may preferably secured and sealed to the aperture in the surface of the front bulkhead 102 by mating threads on each of the housing 302 and along the aperture in the front bulkhead 102. The threads are most preferably provided as double entry Acme threads, which enable the housing 302 to be fitted and sealed to the front bulkhead 102 within a threaded engagement angle of between 30 and 180 degrees, and more preferably within a threaded engagement and in the range of 90 to 120 degrees. Sealing of the housing 302 to the front bulkhead 102 is enhanced with the addition of a dome port housing o-ring 306, which is sealably fitted between the housing 302 and the aperture in the front bulkhead 102 when the housing 302 is threadably fitted to the aperture in the front bulkhead 102.

In addition, the housing 302 is further secured by a locking pin assembly 142, which includes a locking pin 144 that is fitted to a locking pin recess 146 in the front bulkhead 102. A biasing spring 148 and retaining washer 150 are fitted to the locking pin 144 in a cavity within the locking pin recess 146 in order to secure the pin 144 to the recess 146 and exert an outwardly direct force on the pin 144 toward the flange surface of the housing 302 of the lens assembly 300. When mounting the lens assembly 300 to the bulkhead 102, the threaded fitting is advanced until a retaining end of the pin 144 is positioned over the pin seat 310 of the lens assembly 300. In this position, the biasing spring 148 urges the retaining end of the pin 144 forward so that it enters and is secured by the seat 310.

In this manner, the rotational position of the lens assembly 300 relative to aperture in the front bulkhead 102 can be precisely controlled. The pin 144 and biasing spring 148 are preferably made from a corrosion resistant metal such as stainless steel. The pin 144 includes a grippable head at an opposing end to the retaining end, which can be manipulated by the operator to release the pin 144 from the pin seat 310 for removing the lens assembly 300 from the housing 100. One of skill in the art will recognize that the locking pin 144 may alternatively be held within in a pin seat provided in the lens assembly 300, while the seat is provided in the front bulkhead 102. In addition, the pin assembly may be replaced by another retention mechanism such as a conventional ball detent mechanism.

Because the mating threads of the housing 302 and aperture in the front bulkhead 102 linearly advance the position of the housing 302 relative to the bulkhead 102 according to the rotational position, and features of the interior volume of the front bulkhead control the linear position of the optical sensor of the front camera 804 in the digital device relative to the front bulkhead, the linear distance between the optical sensor of the front camera 804 and optical dome 312 can be precisely and repeatably controlled when the pin 144 engages the pin seat 310, thereby providing improved optical performance over multiple interchangeable uses of the device. For further flexibility a filter assembly 400 described further herein infra provides additional selective control over the optical characteristics of the housing 100 relative to the digital device 800.

Figure 23:
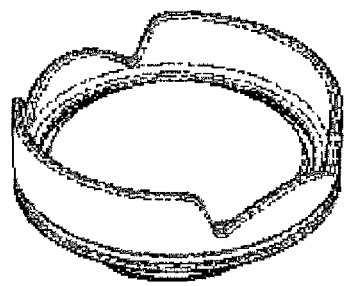
FIGS. 23 and 24 provides a perspective views of a lens apparatus according to aspects of the present invention.
Figure 26:
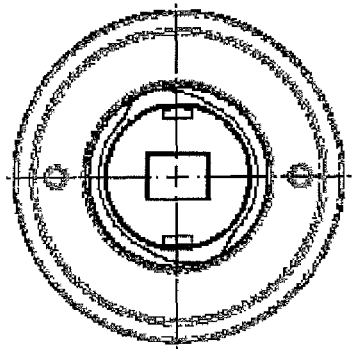
Figure 24:
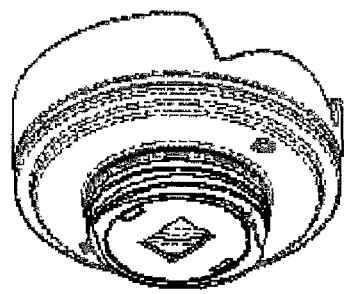
Figure 27:
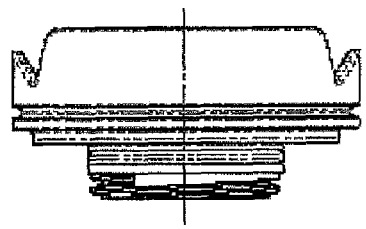
Figure 28:
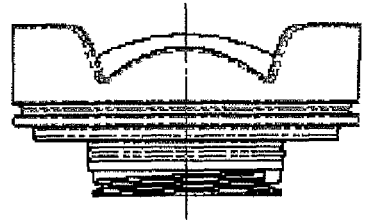

FIGS. 23 and 24 provides a perspective views of lens assembly 300 illustrated by FIGS. 17-22. FIGS. 25-28 respectively provide top, bottom, front/rear and left/right side, views of the lens assembly 300 of FIGS. 17-22.

The previously described FIGS. 17-28 depict one exemplary configuration of the lens mount for the lens apparatus 300 for illustration purposes only. However, it should be readily understood that many configurations consistent with the principles of this disclosure may be adapted from this exemplary configuration. For example, the light mask 308 may be eliminated from the lens apparatus 300 and repositioned within the aperture and coupled to the front bulkhead 102 to position it preferably closer to the optical sensor of the digital device's front camera 804. Moreover, in the described exemplary embodiment, the locking pin 144 is disposed on the front bulkhead 102 and corresponding pin seat 310 on the dome port housing 302 for relative ease of use. However, it is alternatively possible in accordance with this aspect of the invention to locate the locking pin on the dome port housing 302 for engagement with a pin seat 310 located on the front bulkhead 102.

Figure 29:
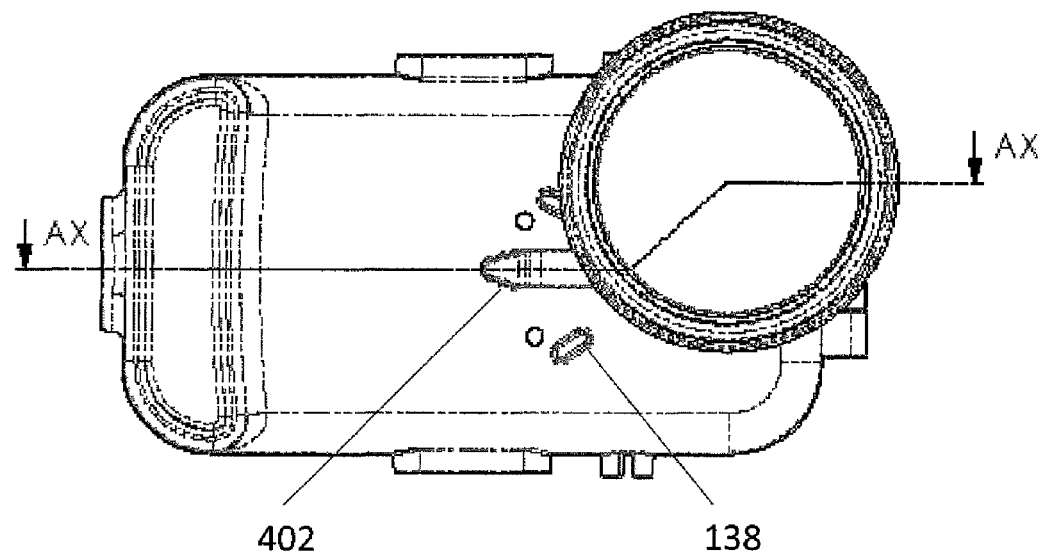
FIGS. 29 and 30 respectively provide front and rear views of the waterproof housing of FIGS. 1 and 2, illustrating a selectable filter arrangement.
Figure 30:
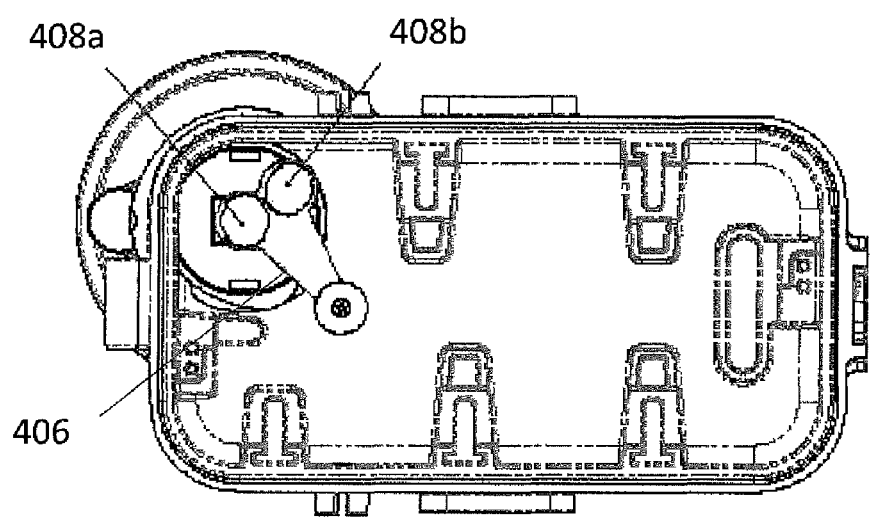
Figure 32:
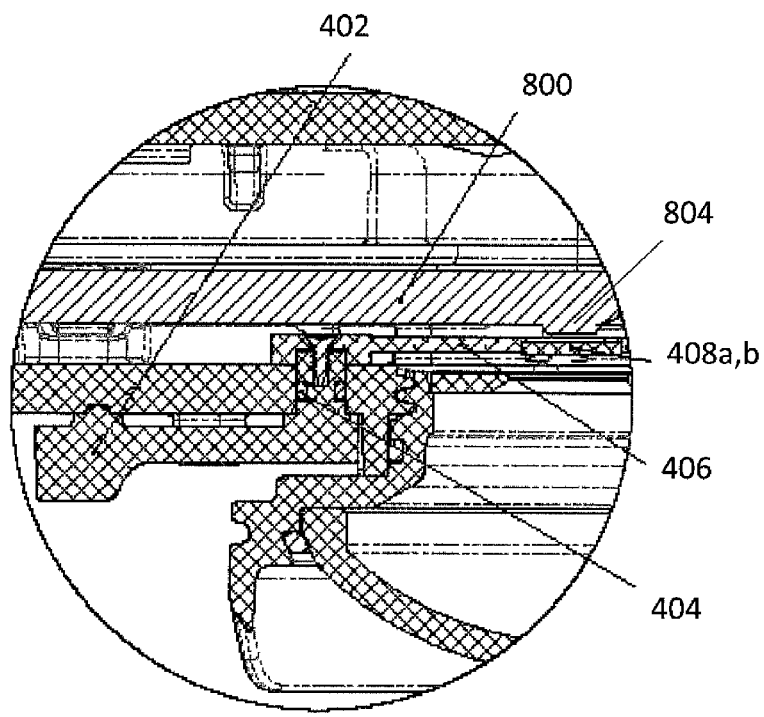
FIGS. 31 and 32 respectively provide a sectional view and magnified sectional view taken along line AX-AX of FIG. 29.
Figure 31:
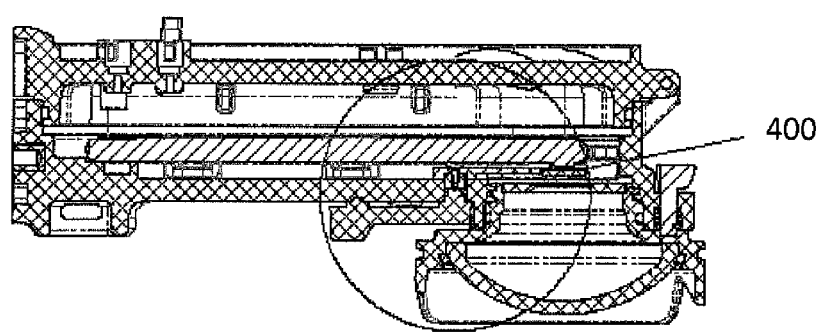
Figure 33:
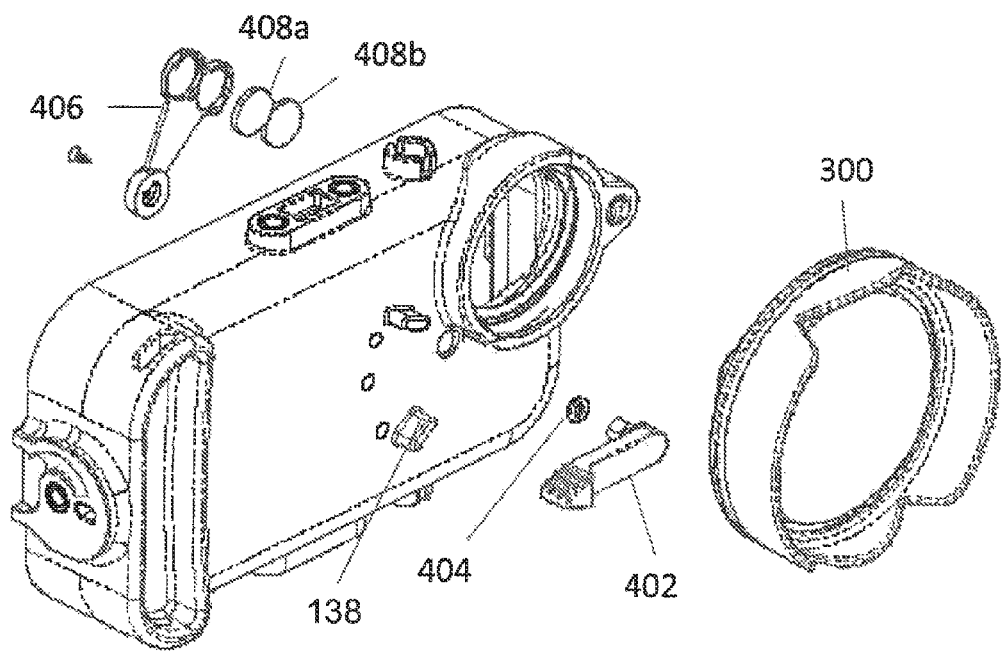
FIG. 33 provides an exploded perspective view of the waterproof housing of FIGS. 29 and 30.
Figure 34:
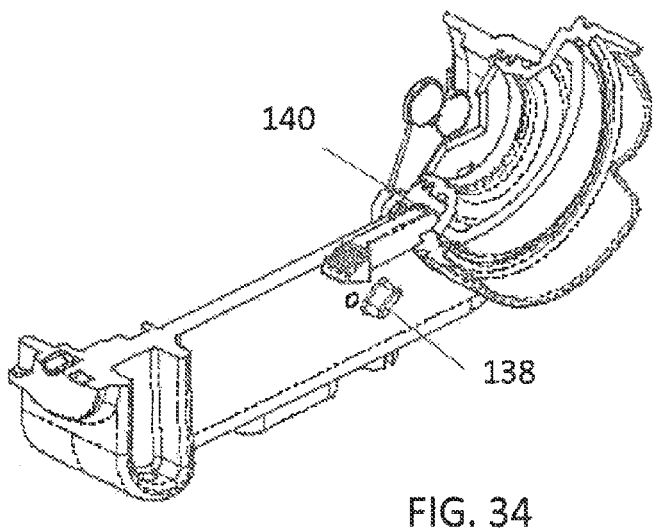
FIG. 34 provides a partial perspective view of the waterproof housing of FIGS. 29 and 30 that is cut along the line AX-AX of FIG. 29.
Figure 40:
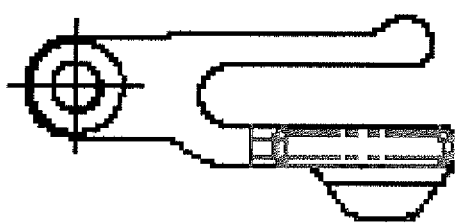
FIGS. 40-45 respectively provide top, rear, left side, front, right side and bottom views of the digital device retention member of FIG. 39.

FIGS. 29 and 30 respectively provide front and rear views of the waterproof housing 100 of FIGS. 1 and 2, and illustrate a selectable filter assembly 400 that is preferably provided as a component of the housing 100 in accordance with another aspect of the disclosure. FIGS. 31 and 32 respectively provide a sectional view and magnified sectional view taken along line AX-AX of FIG. 29. FIG. 33 provides an exploded perspective view of the waterproof housing of FIGS. 29 and 30, and FIG. 34 provides a partial perspective view of the waterproof housing of FIGS. 29 and 30 that is cut along the line AX-AX of FIG. 29.

The filter assembly 400 illustrated by FIGS. 29-34 includes a lever 402 positioned externally on a front-facing outer surface of the front bulkhead 102, which can be manipulated to rotate a filter frame 406 that is positioned within the interior volume of the front bulkhead 102 to selectively place one of the filters 408*a* and 408*b* in an optical path between the front-facing camera 804 of the digital device 800 and the lens assembly 300 mounted in the aperture of the front bulkhead 102. Alternatively, the lever 402 can be manipulated to rotate each of the filters 408*a* and 408*b* out of the optical path between the front-facing camera 804 of the digital device 800 and the lens assembly 300. The lever 402 is preferably removably coupled to the filter frame 406 by cylindrical portion for receiving a fastener such as a screw, and the cylindrical portion is positioned through an seat 140 in the front bulkhead 102 for coupling to the filter frame 406.

The cylindrical portion of the lever 402 includes a seat for holding an o-ring 404 for sealing the interior components of the filter assembly 400 in a waterproof manner. The front bulkhead 102 is further preferably provided with stop features 138 in order to limit the travel of the lever 402 and thereby prevent over-rotation of the filter frame 406. Filters 408*l*, 408*b* may include one or more of a variety of conventional underwater correction filters selected according to the underwater application, and/or one or more effects-oriented filters (for example, diffusion and star filters).

FIG. 35 provides an open rear view of the waterproof housing 100 of FIG. 1 including retention members 136 used to retain the digital device 800 within the housing 100. FIG. 36 provides a partially exploded perspective view of the housing and retention members 136 of FIG. 35, and FIGS. 37 and 38 respectively provide a perspective and magnified perspective view of the housing and one retention member of FIG. 35. As depicted for example in FIGS. 36 and 38, the retention members 136 have a wishbone configuration and are positioned within the interior volume of the front bulkhead 102 in retention wells 137, where they are preferably retained by a screw fastened to the front bulkhead 102.

A free end of the wishbone terminates in a lever member 136a, which can be pushed inwardly by the operator to place the digital device 800 in or remove the digital device 800 from the interior volume of the front bulkhead 102. The free end of the wishbone also includes a tab 136b, which is configured to extend over a back-facing surface extending outwardly from the touch screen 802 that clamps the digital device 800 within the interior volume of the front bulkhead 102.

Figure 39:
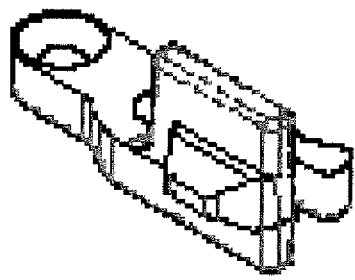
FIG. 39 provides a perspective view of a digital device retention member according to aspects of the present invention.
Figure 41:
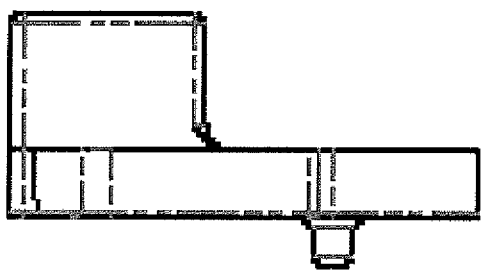
Figure 42:
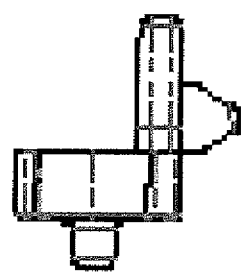
Figure 43:
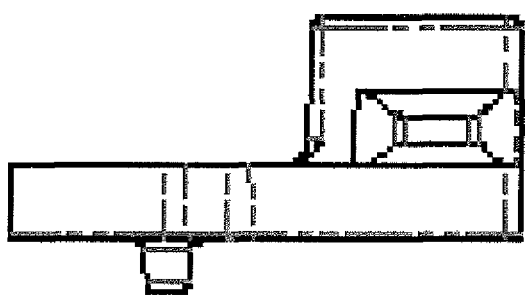
Figure 44:
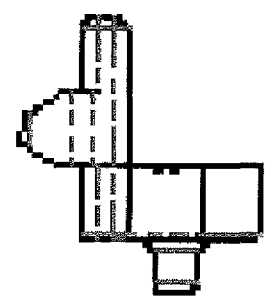
Figure 45:
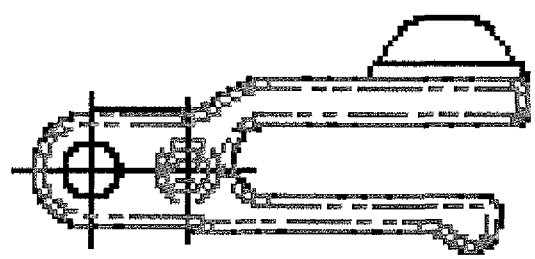

Additional design features of the retention member 136 are apparent in FIG. 39, which provides a perspective view of the retention member 136 illustrated by FIGS. 35-38. FIGS. 40-45 respectively provide top, rear, left side, front, right side and bottom views of the retention member depicted by FIG. 39.

FIG. 46 provides a rear view of the waterproof housing 100 of FIGS. 1 and 2. As depicted in FIG. 46, and in addition to the top button assembly 114 and top tripod/pip mount 116 described supra with reference to FIG. 1, the housing 100 may be provided with a bottom button assembly 118 and bottom tripod/grip mount 116. The bottom button assembly may be advantageously used, for example, to operate the "volume up" button of the IPHONE 6 smart phone, which often activates respective operations of cameras and/or video capture applications, such as the camera shutter-like operation.

In conjunction with FIG. 46, FIGS. 47 and 48 respectively provide a perspective and magnified perspective view of the housing of FIG. 46 that illustrates a rear camera dome 122 and camera selection button assembly 124 of the housing 100. The camera dome is clear and transparent, and preferably integrally molded together with the rear bulkhead 108 as a single molding from a material such as polycarbonate. The domed shape of the dome 122 is advantageously used in underwater environments in combination with the rear camera of the digital device 800 for improved light balance and proportional rendering of images.

Figure 49:
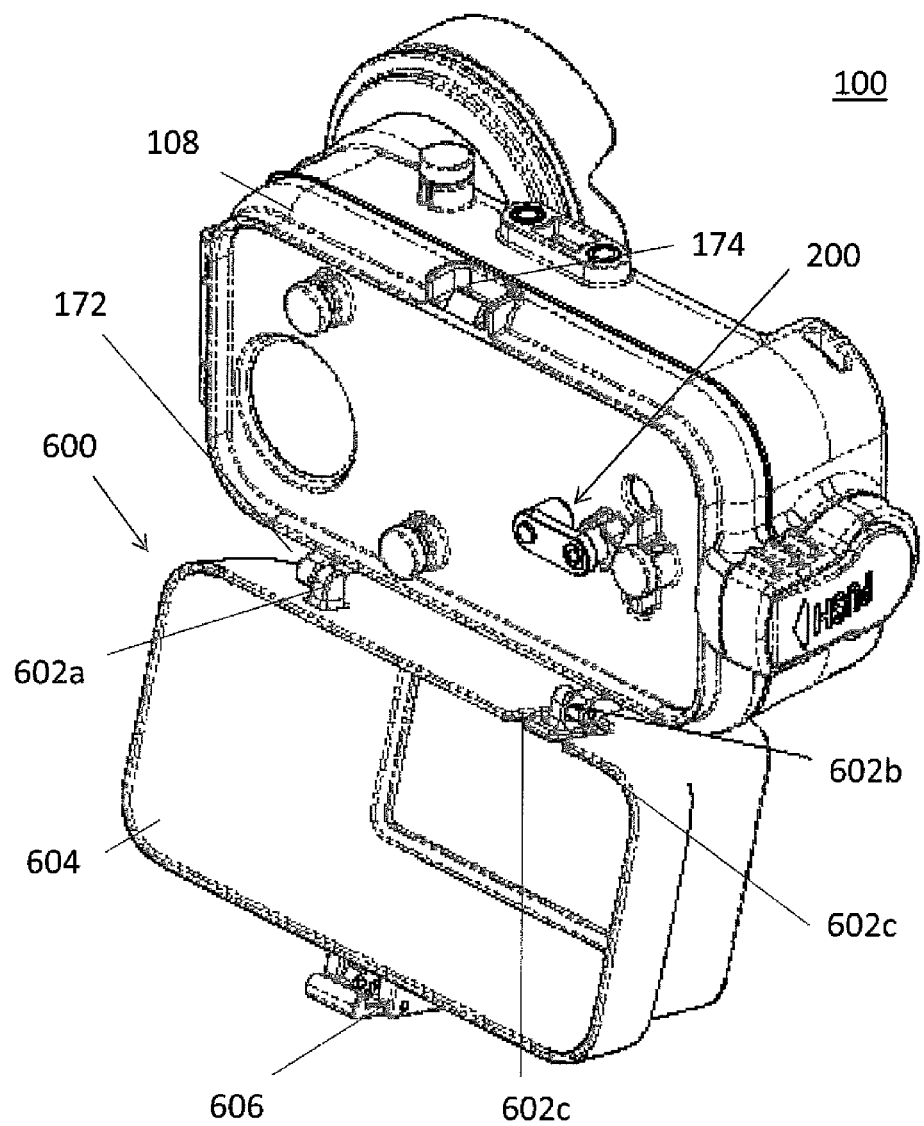
FIG. 49 provides a rear perspective view of a waterproof camera housing including a light shade component.
Figure 50:
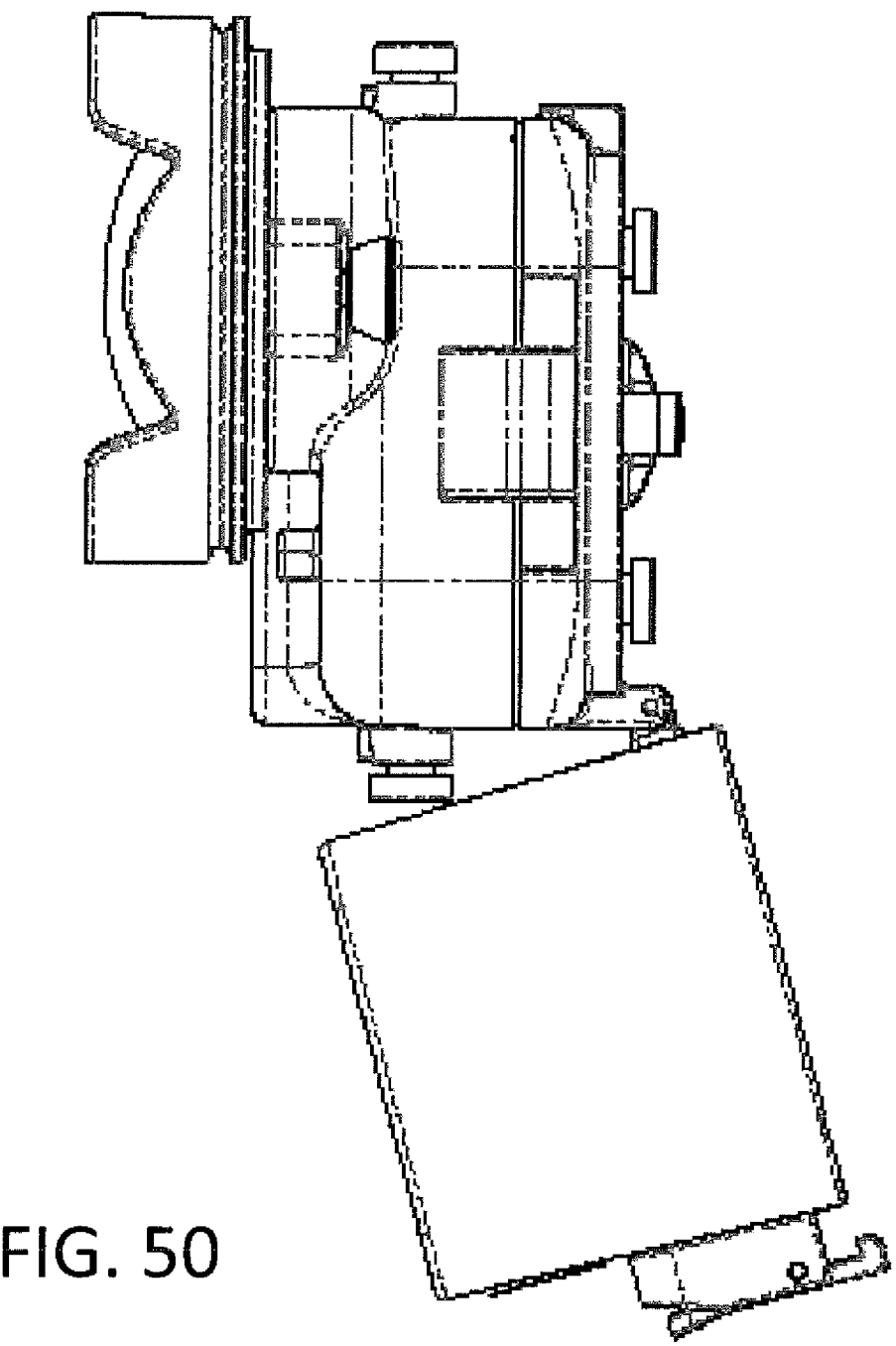
FIG. 50 provides a right side view of the waterproof camera housing of FIG. 49 with the light shade component shown in a disengaged position.
Figure 51:
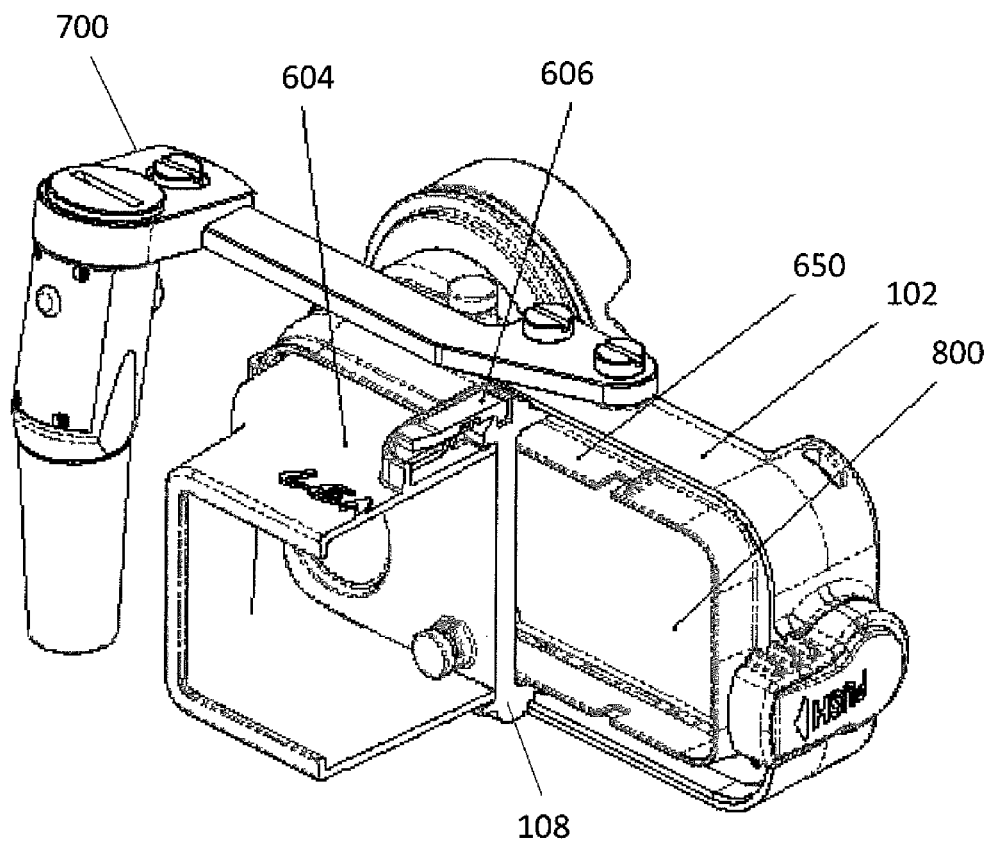
FIG. 51 provides a rear perspective view of a waterproof camera housing of FIG. 49 including a light shade component and a grip component, where the light shade component is shown as a cut-a-way.
Figure 52:
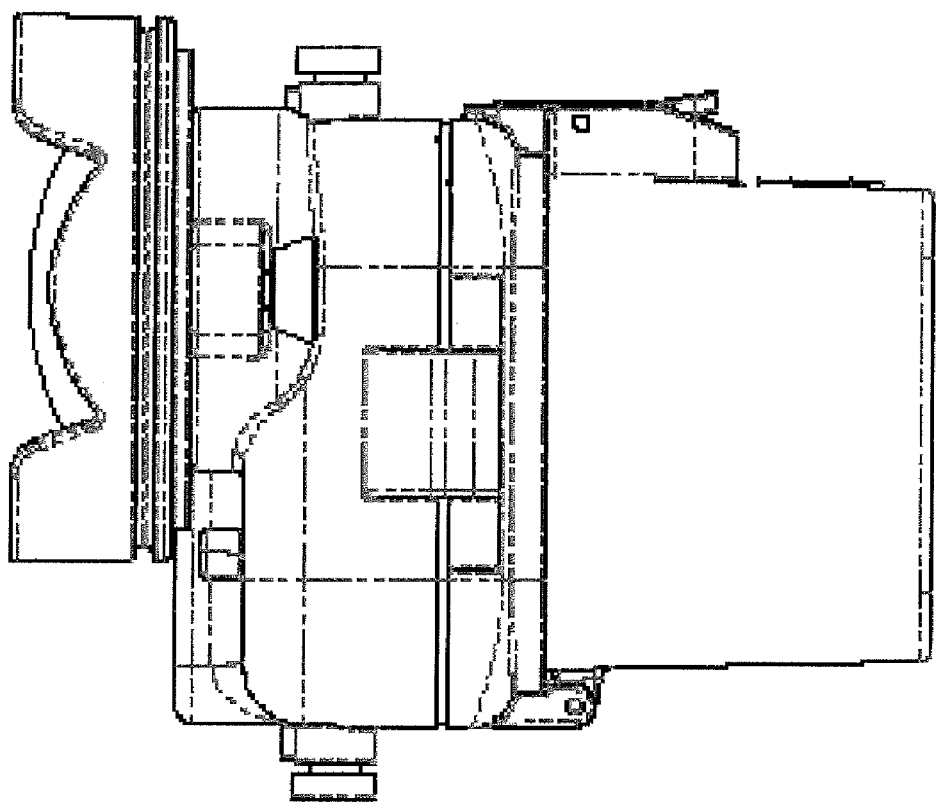
FIG. 52 provides a right side view of the waterproof camera housing of FIG. 49 with the light shade component shown in an engaged position.
Figure 53:
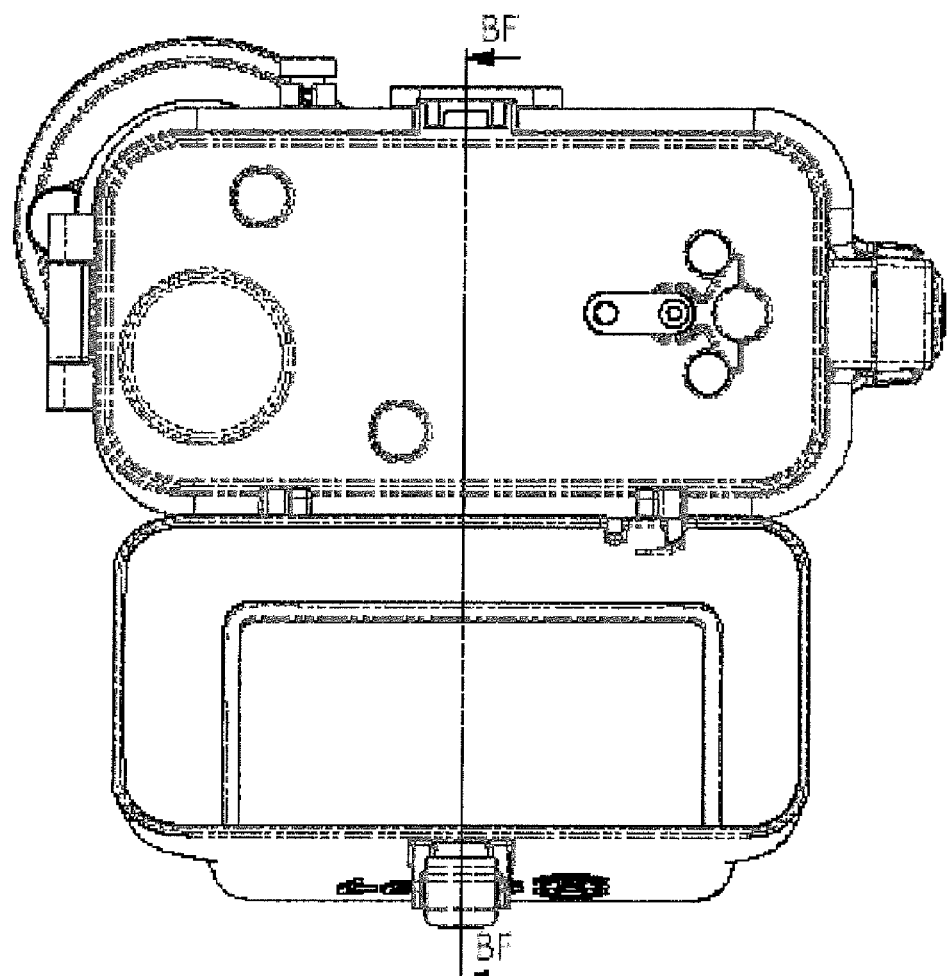
FIG. 53 provides a rear view of the waterproof camera housing of FIG. 49 with the light shade component shown in a disengaged position.
Figures 54, 55:
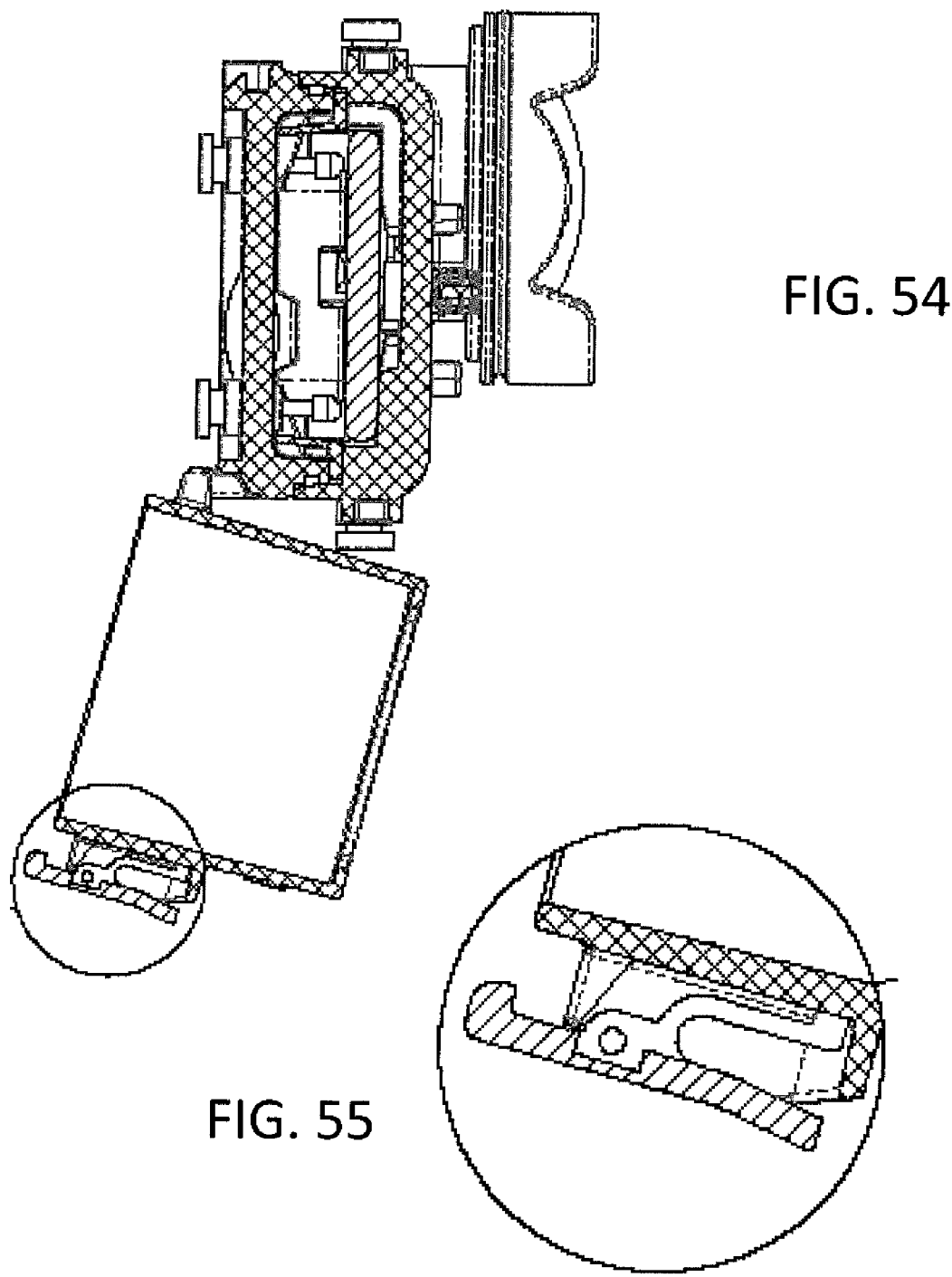
FIGS. 54 and 55 respectively provide a right-side sectional view and magnified right side sectional view of the housing of FIG. 49 that is cut along the line BF-BF of FIG. 53, with the light shade component shown in the disengaged position.
Figure 56:
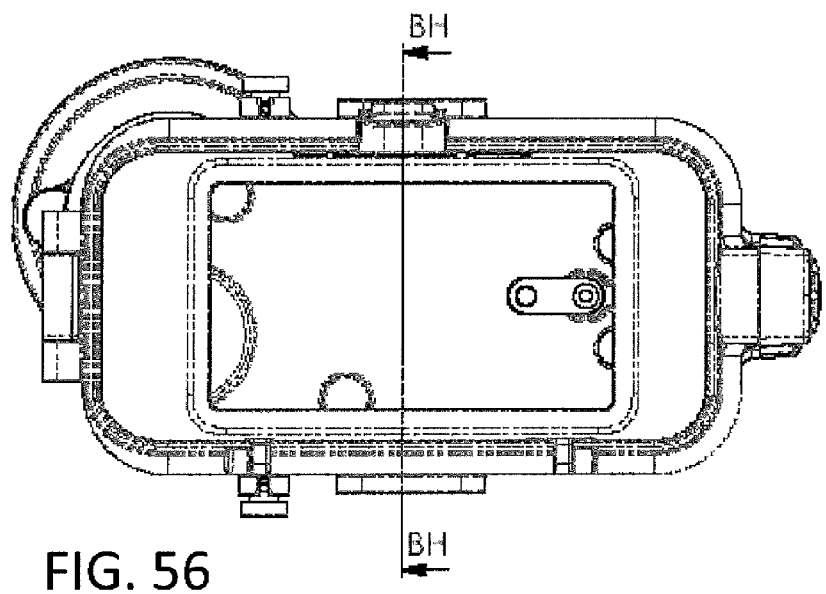
FIG. 56 provides a rear view of the waterproof camera housing of FIG. 49 with the light shade component shown in an engaged position.
Figure 58:
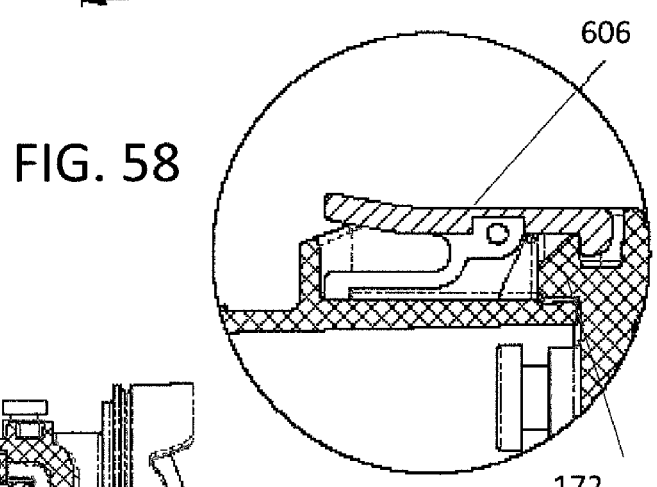
FIGS. 57 and 58 respectively provide a right-side sectional view and magnified right side sectional view of the housing of FIG. 49 that is cut along the line BH-BH of FIG. 56, with the light shade component shown in the engaged position.
Figure 57:
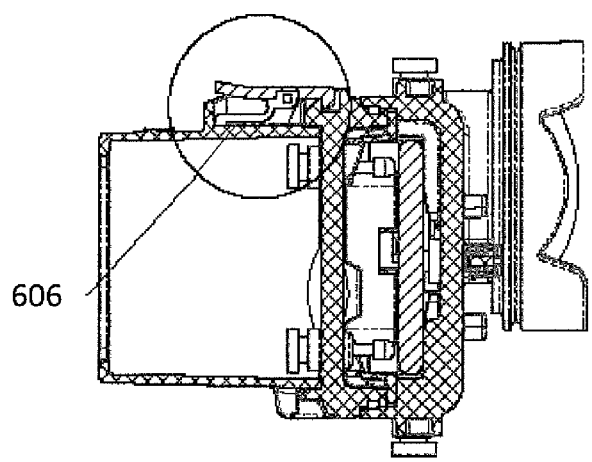

FIGS. 49 and 50 respectively provide rear perspective and right side views of the waterproof camera housing 100, including an optional rear-facing light shade 600 shown in a disengaged position. FIG. 51 provides a rear perspective view of the housing 100 and light shade 600, together with an optional grip 700, where the light shade 600 is shown in partial cut-a-way and in an engaged position. FIGS. 52 and 53 respectively provide a right side view and a rear view of the housing 100 and light shade 650. FIGS. 54 and 55 respectively provide a right-side sectional view and magnified right side sectional view of the housing of FIG. 49 that is cut along the line BF-BF of FIG. 53. FIG. 56 provides a rear view of housing 100 and engaged light shade 600. FIGS. 57 and 58 respectively provide a right-side sectional view and magnified right side sectional view along the line BH-BH of FIG. 56.

With reference to FIGS. 49-58, the rear-facing light shade 600 is formed as a hollow, rectangular box-like element 604 with a profile that diminishes in area from an open front-facing surface to an open rear-facing surface through which the operator is able to view the touch screen 802 of the digital device. The opening at the front-facing surface is configured to sealably fit over an exterior surface of the rear bulkhead 108 in order to substantially reduce the amount of stray light reflecting off the touch screen 802 when viewing the image captured by the light sensor of a camera of the digital device. However, in certain light conditions, it may be more advantageous to disengage and rotate the light shade 600 away from the touch screen 802 to view the screen with out the light shade 600.

With reference to FIG. 49, the light shade 600 is releasably secured to the rear bulkhead 108 by means of hinge members 602a, b which are coupled to hinge members 172 that are integral with the rear bulkhead 108, and via a latch 606 that mates with a latch plate 174 that is shown as a molded feature of the rear bulkhead 108. Alternatively the latch plate 174 could be formed as a separate piece that is fastened to the rear bulkhead 108, for example, by means of conventional fasteners. This latch and hinge arrangement enables the operator to secure the light shade 600 in an engaged position by fastening the latch (for example, as illustrated by FIGS. 51, 52 and 56-57). Upon releasing the latch, the light shade 600 can be rotated downwardly to a disengaged position (for example, as illustrated by FIGS. 49, 50 and 53-55) to enable the operator to have unfettered access to control features of the housing 100 provided in close proximity to the touch screen 802 (for example, including the actuator assembly 200. By maintaining the coupling between the hinge members 172 and 602a, b, the light shade 600 is easily restored to the engaged position by rotating the shade body 604 upwardly and re-fastening the latch 606 to the latch plate 174.

As shown in FIG. 49, hinge member 602b is provided on a portion of the hinge body 604 and includes slits 602c positioned on opposing sides and perpendicular to a hinge axis of the hinge member 602b. A third side of the hinge member 602b that is parallel to the hinge axis terminates at the front edge of the shade body 604. In this configuration, the hinge member 602b can be readily moved by the operator in a direction to disengage the hinge member 602b from its corresponding hinge member 172 that is integral with the rear bulkhead 108. In this manner, the light shade 600 can be completely decoupled from and re-coupled to the housing 100.

Figures 59, 60:
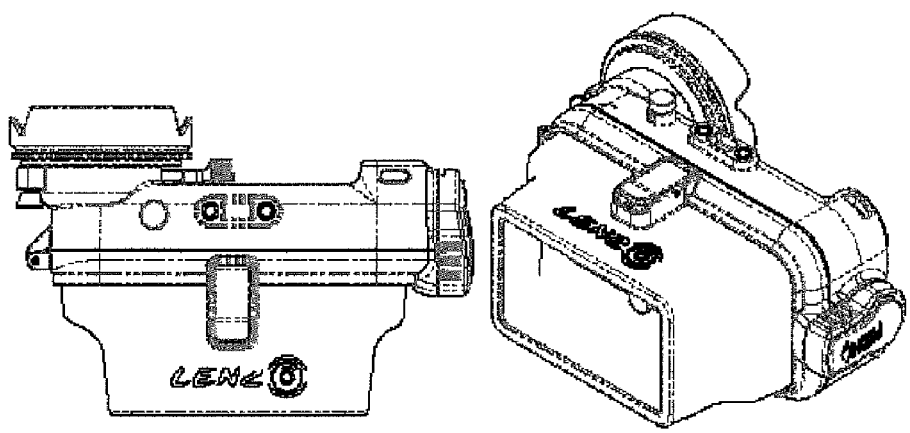
FIG. 59 provides a rear perspective view of the waterproof camera housing of FIG. 49 with the light shade component shown in the engaged position.
FIGS. 60-65 respectively provide top, front, right side, rear, right side and bottom views of the waterproof camera housing of FIG. 49.
Figures 61, 62:
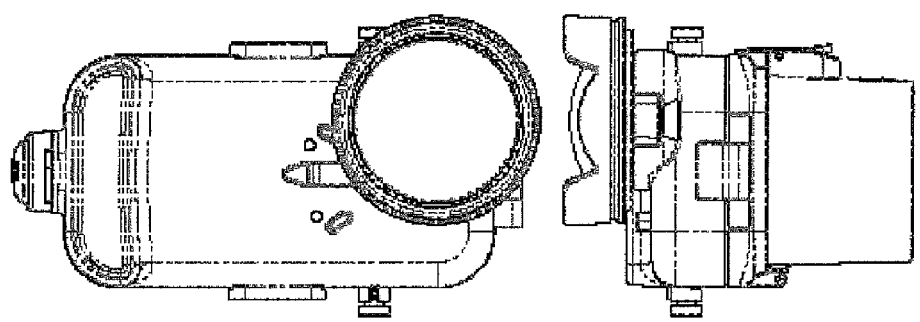
Figure 63:
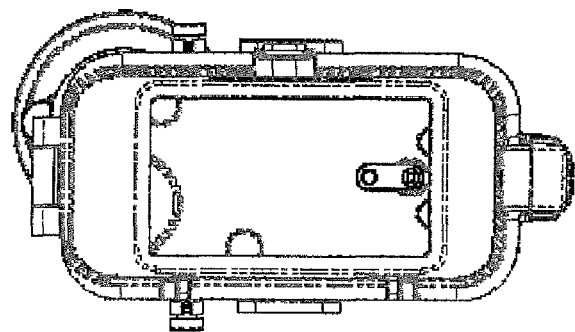
Figure 64:
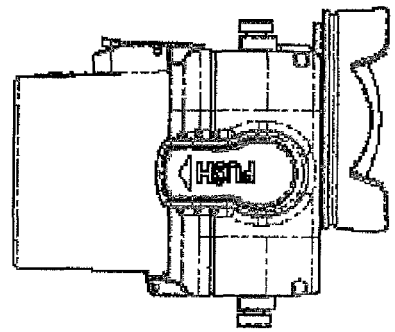
Figure 65:
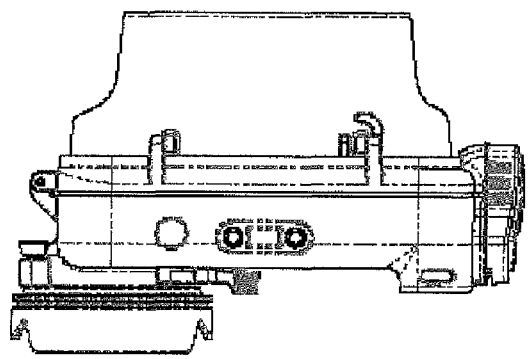
Figure 73:
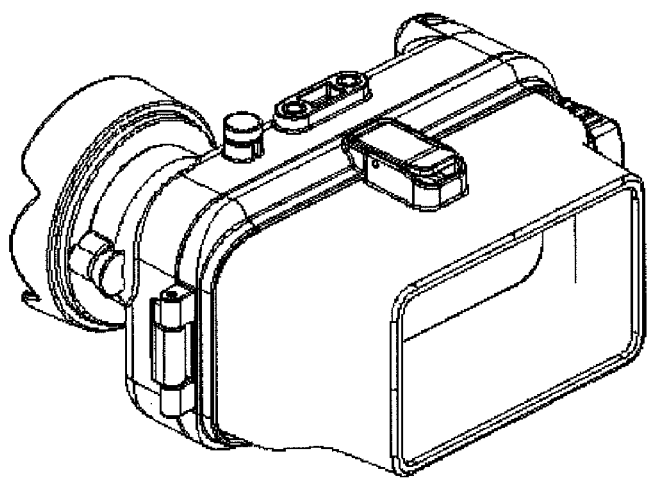
FIGS. 73 and 74 respectively provide rear and front perspective views of the waterproof camera housing of FIG. 49.
Figure 74:
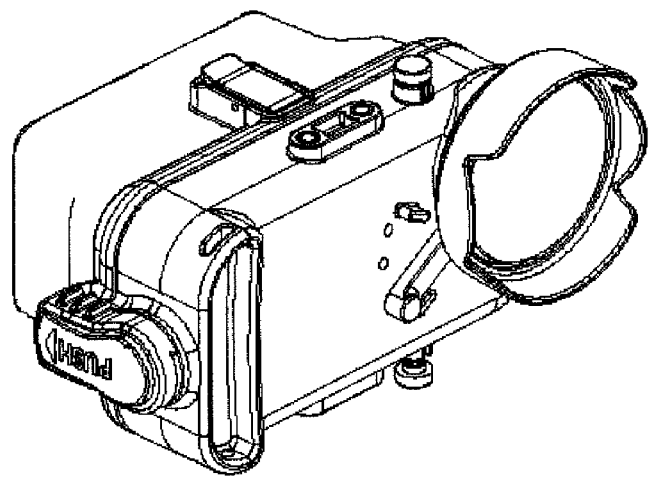

FIG. 59 provides a rear perspective view of the housing 100 provided with an optional light shade element 600 as illustrated by FIGS. 49-58, with the light shade component 600 shown in an engaged position relative to the housing 100. FIGS. 60-65 respectively provide top, front, right side, rear, right side and bottom views of the housing 100 of FIGS. 49-58. FIGS. 73 and 74 provide additional perspective views of the housing 100 and light shade 600.

Figure 66:
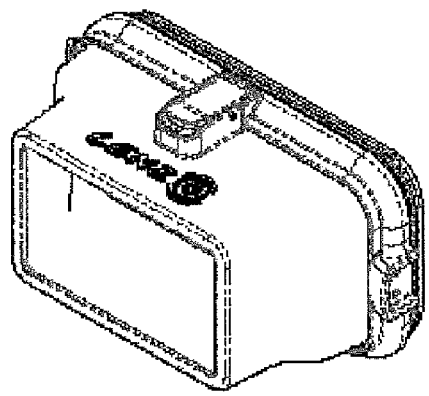
FIG. 66 provides a rear perspective view of the light shade, rear bulkhead and light mask components of the waterproof camera housing of FIG. 49.
Figure 67:
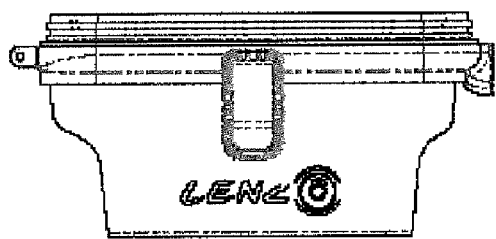
FIGS. 67-72 respectively provide top, front, right side, rear, left side and bottom views of the components of FIG. 66.
Figure 68:
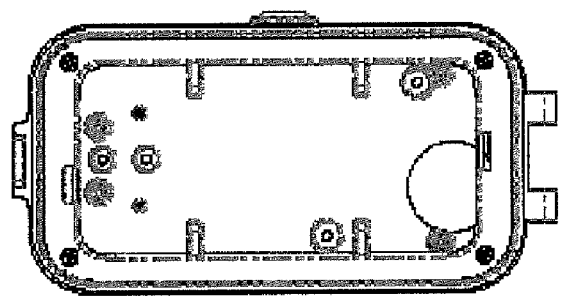
Figure 69:
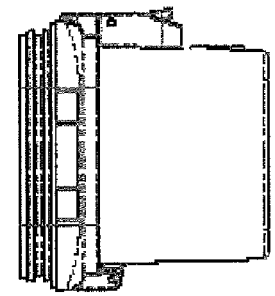
Figure 70:
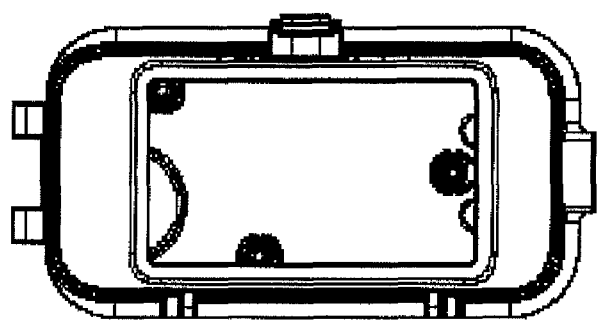
Figure 71:
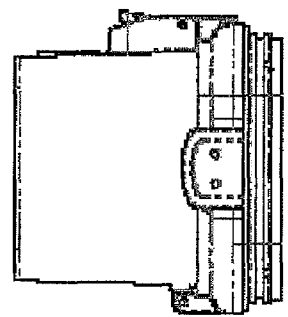
Figure 72:
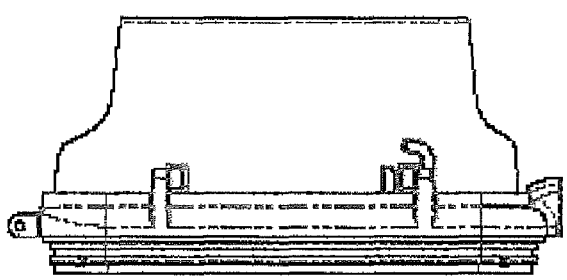

FIG. 66 provides a rear perspective view of the light shade element 600, rear bulkhead 108 and light mask 650 of the housing 100 of FIGS. 49-58. FIGS. 67-72 respectively provide top, front, right side, rear, left side and bottom views of the light shade element 600, rear bulkhead 108 and light mask 650 of the housing 100 of FIGS. 49-58.

The exemplary configuration of the disengageable light shade 600 in FIGS. 49 to 74 is for illustration purpose only. It should be readily understood that alternative light shade configurations are useable in accordance with the invention including for example, a light shade having compressible accordion-style arrangement. Also, although the light shade is depicted comprising four sides, it is possible to implement a light shade having a smaller number of sides (for example, omitting one of bottom side, and/or the left or right sides, for improved access to controls provided on a back surface of the rear bulkhead 108.

Figures 75, 76:
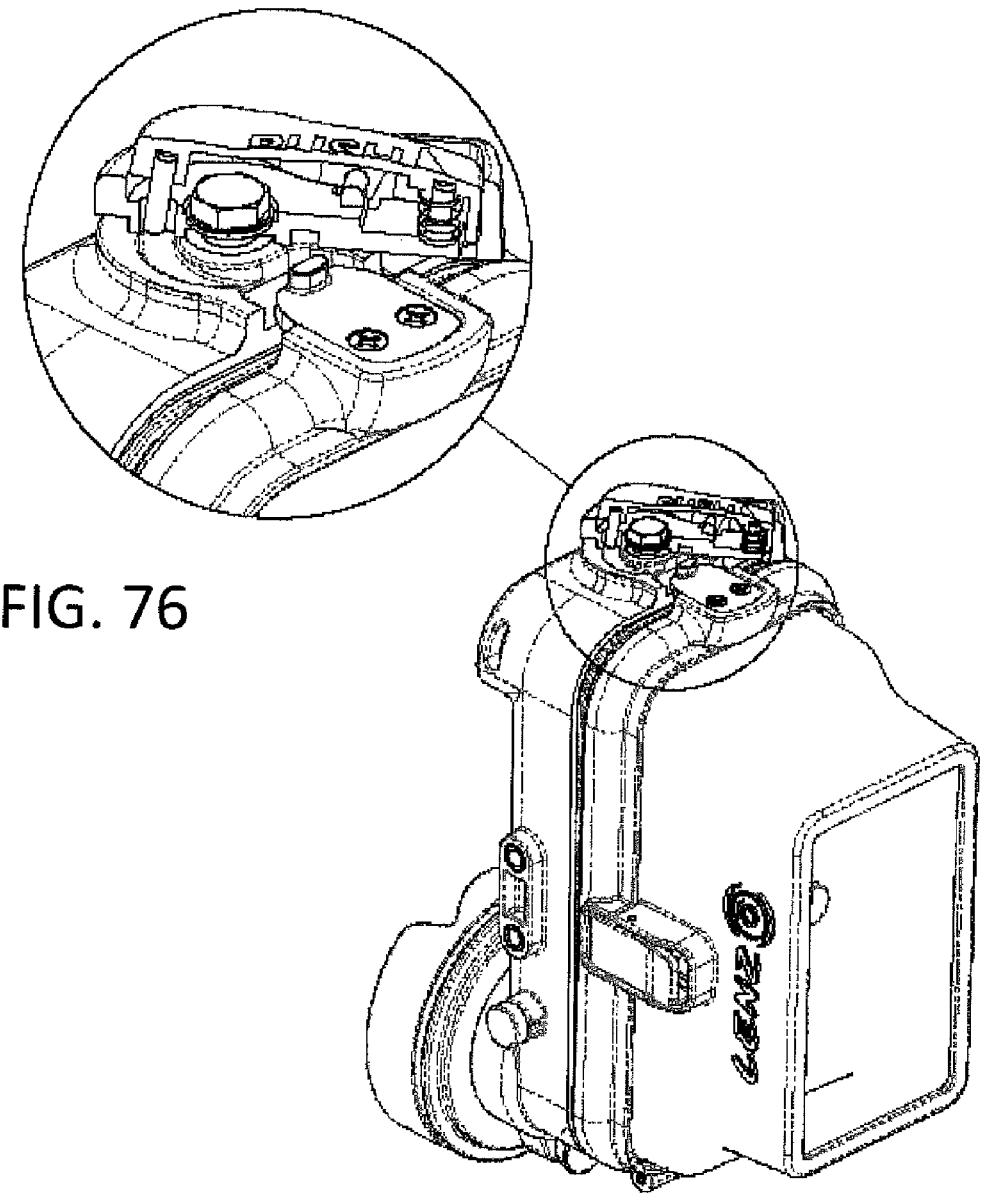
FIGS. 75 and 76 respectively provide a rear perspective view and magnified rear perspective view of the waterproof camera housing of FIG. 49, including a cutaway view of an exemplary latch component of the waterproof camera housing in accordance with as aspect of the disclosure, wherein the latch is in an open position.
Figure 78:
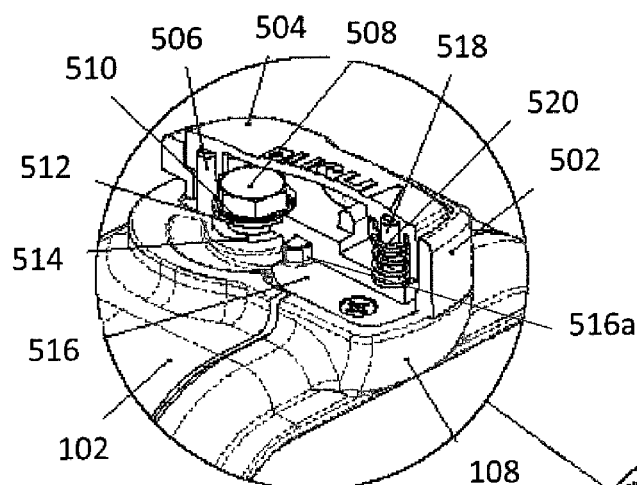
FIGS. 77 and 78 respectively provide a rear perspective view and magnified rear perspective view of the waterproof camera housing of FIGS. 75 and 76, including a cutaway view of a latch component of the waterproof camera housing in a closed position.
Figure 77:
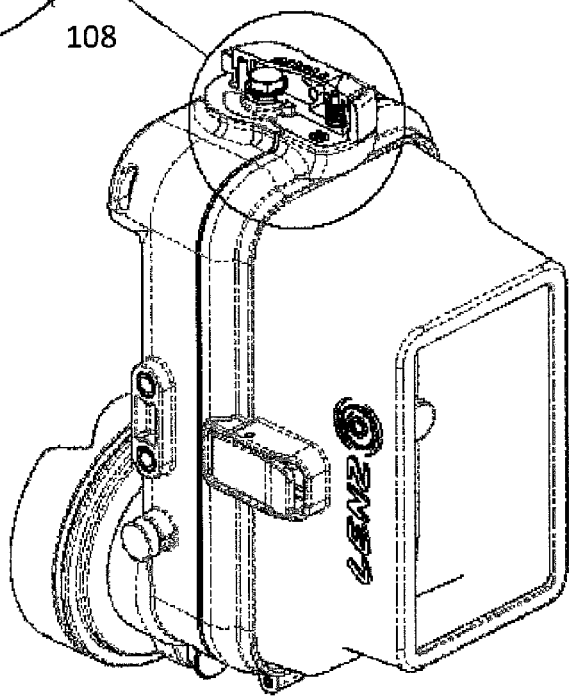
Figure 79:
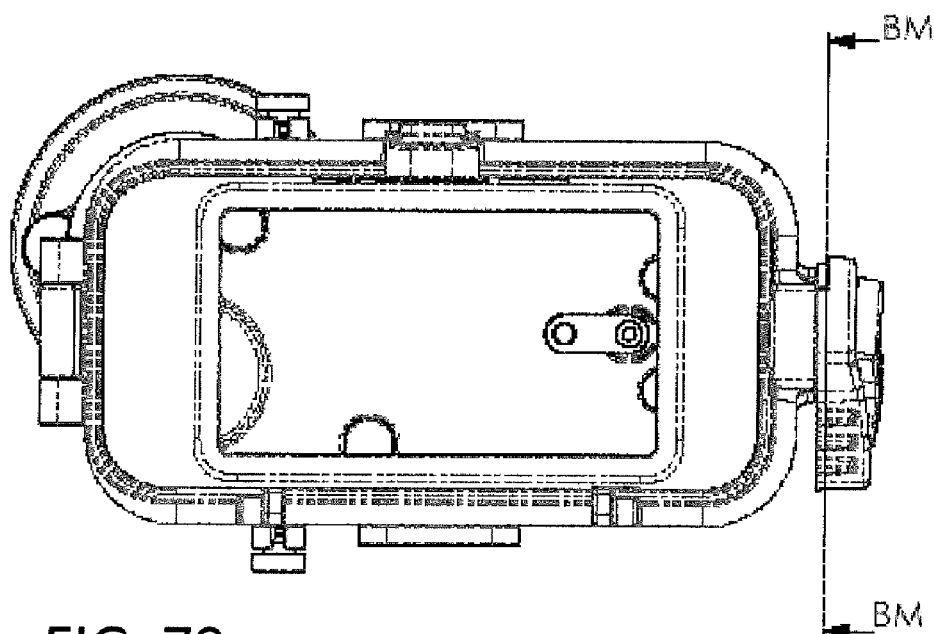
FIGS. 79 and 80 respectively provide rear and left side views of the waterproof camera housing of FIGS. 75 and 76, with the latch component shown in FIGS. 75-78 in cut-a-way along the line BM-BM of FIG. 80.
Figure 80:
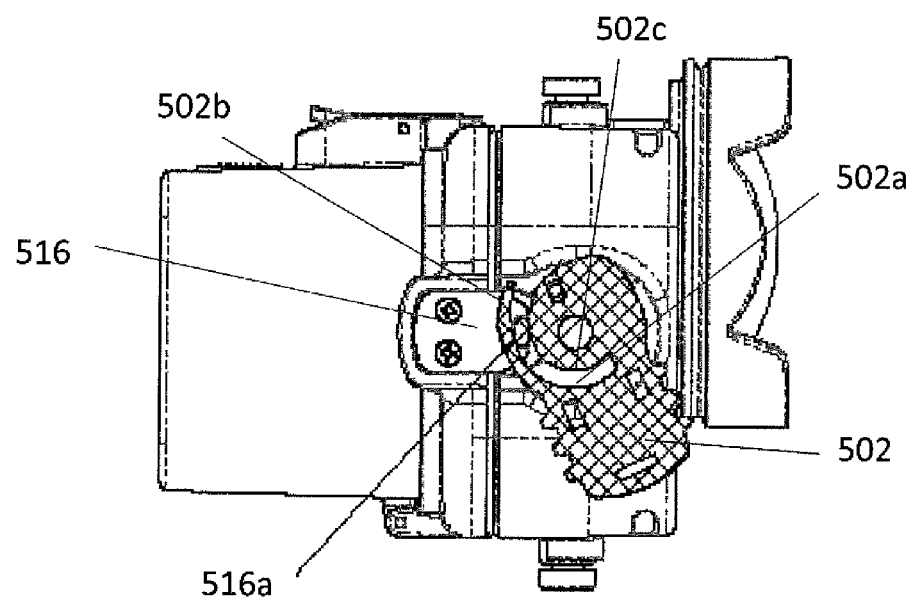
Figure 82:
FIGS. 82-87 respectively provide top, front, right side, bottom, rear and left side views of the latch component of FIG. 81.

FIGS. 75 and 77 each provide a rear perspective view of the housing 100, including partial cut-a-way views of the latch 500 respectively in open and closed positions. FIGS. 76 and 78 respectively provide magnified rear perspective view illustrating elements of the latch 500. FIGS. 79 and 80 respectively provide rear and left side views of the housing 100, with the latch 500 shown in FIG. 81 in a cut-a-way view along the line BM-BM of FIG. 80.

With particular reference to FIG. 78, it can be seen that the latch 500 includes a latch body 502 which may be manipulate by the operator to open and close the latch 500. The latch body 502 is secured to the front bulkhead 102 by means of a retainer screw 508 and washers 510, 512 and 514, which enable the latch body 502 to be rotatable about an axis defined by the screw 508 after the screw 508 has been securely fastened to the front bulkhead 102. A corresponding latch strike 516 is secured to the rear bulkhead 108, for example, by means of conventional screw fasteners. As illustrated for example by FIGS. 78 and 89, the latch strike 516 includes a latch strike pin 516a which mates with a cam slot 502a of the latch body 502.

As the latch body 502 is rotated by the operator to close the latch 500, an outer wall 502b of the cam slot 502a makes contact with an outer surface of the latch strike pin 516a to draw the pin 516a inwardly towards the axis defined by the retainer screw 508 as a clockwise rotation of the latch body 502 is executed by the operator. Similarly, upon the operator rotating the latch body 502 in a counter-clockwise direction to open the latch 500, an inner wall 502c of the cam slot 502a contacts an inner surface of the latch strike pin 516a to push the pin 516a outwardly from the axis defined by the retainer screw 508. Significantly, the slot 502a and strike pin 516a are dimensioned so that the strike pin 516a avoids simultaneous contact the outer wall 502b and the inner wall 502c of the cam slot 502a. This substantially reduces associated frictional forces and difficulty of operation relative to prior art designs.

Returning to FIG. 78, the latch 500 includes a guide pin 518 substantially vertically fixed within the latch body 502 at a position distally from the retainer screw 508. A spring 520 is fitted over the guide pin 518, and an upper surface of the spring 520 makes compressive contact with an interior spring seat of a latch cover retainer 504, which is preferably snap fitted within an interior cavity of the latch body 502. A locking pin 506 is fixed to the latch cover retainer 504, and substantially vertically within the latch body 502 at a position proximal to the retainer screw 508 when the latch cover retainer 504 is fitted to the latch body 502. In a closed position of the latch 500, the spring 520 exerts an upwardly-directed force on the latch cover retainer that causes it to toggle and apply a downwardly-directed force on the locking pin 506 that is sufficient for causing a locking end of the locking pin 506 to enter a recess in a surface of the front bulkhead 102 extending below the latch 500. In this manner, the latch is locked in the closed position so that, for example, the housing may not be accidentally opened when in use underwater to expose the smart phone 800 to possible water damage. In order to open the larch 500 once it has been placed in the closed, locked position, the operator may press downwardly on the latch cover retainer 504 in the are of the guide pin 518 to compress the spring 520 and raise the locking pin 506 so that the locking pin 506 may be withdrawn from the recess in the surface of the front bulkhead 102.

Figure 81:
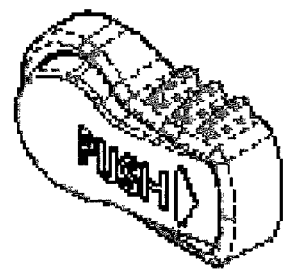
FIG. 81 shows a front perspective view of the latch component of FIGS. 75 and 76.
Figure 83:
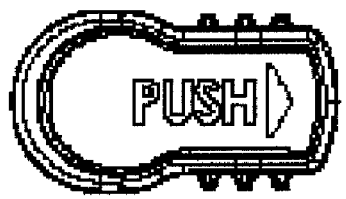
Figure 84:
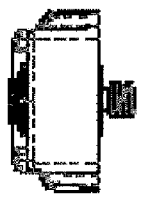
Figure 85:
Figure 86:
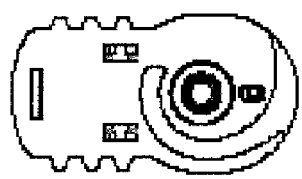
Figure 87:
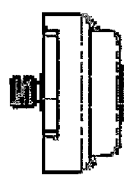

FIG. 81 shows a front perspective view of the latch component of FIGS. 75 and 76; FIGS. 82-87 respectively provide top, front, right side, bottom, rear and left side views of the latch component of FIG. 81

Figure 91:
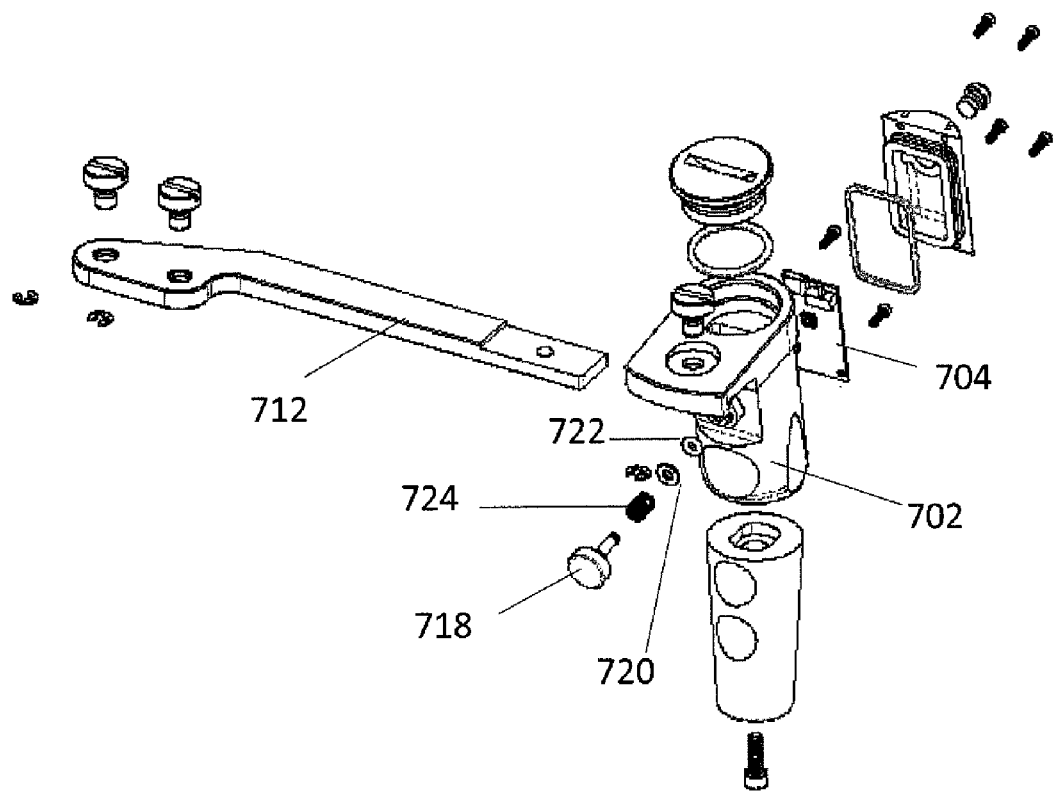
FIG. 91 provides an exploded front perspective view of the grip component of FIG. 88.

FIG. 88 provides a front view of an optional grip 700 for attachment to the waterproof housing 100. FIGS. 89 and 90 respectively provide a sectional view and magnified sectional view in cut-a-way along the line AU-AU of FIG. 88. FIG. 91 provides an exploded front perspective view of the grip component of FIG. 88. As illustrated for example by FIGS. 90 and 91, the grip 700 as depicted includes a grip body 702 that is fastened to a support plate 712 by means of a locking screw 716. The support plate may then be attached to the housing 100 (for example, at the tripod/grip mount 116 illustrated by FIG. 9) by means of a one or more locking screws 714.

The grip body 702 as illustrated by FIGS. 90 and 91 is designed to be gripped by the operator, and has a trigger assembly that includes a trigger 718 and associated spring 724 that are held within an orifice of the grip body 702 by means of a retainer washers 720 and 730, and sealed within the orifice by means of an o-ring 722. Depending upon the operator's preference, the grip 700 may include an extension 710 that is fastened to the grip body 702 (for example, by a conventional bolt fastener) and extends downwardly from a bottom surface of the grip body 702 to extend the surface area of the grip body 702 that may be gripped by the operator.

The trigger 718 is positioned to operate an electrical switch provided on a wireless signal transmission circuit board 704. Suitable circuit boards may include, for example, those containing or configured to receive Bluetooth wireless transmission integrated circuit devices, such as conventional circuit boards used in smart phone monopod sticks produced by iStablizer of Kamas, Utah. In addition to the switch, the board 704 preferably includes an electrical storage device (capacitor or battery), a display, and a BLUETOOTH transmitter capable, for example, of transmitting the BLUETOOTH signal interpreted by the IPHONE 6 smart phone as comprising a "volume up" command, which is interpreted as a shutter click command by many smart phone camera applications. Although BLUETOOTH signals transmitted under water or in wet conditions are highly attenuated due to the water, Applicants discovered that a typical BLUETOOTH output signal can be transmitted underwater at distances of 6 inches or less, which is sufficient for use in the intended grip 700.

Employing a BLUETOOTH transmitter for transmitting signals is particularly advantageous for conventional digital devices because a large number of digital devices employ BLUETOOTH receivers. Nevertheless, any other wireless transmitter that can be received by a digital device located within a few inches of such transmitter when under water is useable in accordance with the present invention, including, for example, ZIGBEE transmitters.

Returning to FIGS. 90 and 91, the grip 700 is also provided with a display window 728 that is sealed within the a cover piece 706 by means of an o-ring 729. The display window 728 provides visual access to the display on the board 704, which may for example preferably include one or more single or multi-color LED devices for signaling and state of electrical capacity, charging status and/or digital device 800 readiness to receive a shutter click via the trigger 718 or to report the execution of a shutter click by the digital device 800. The cover piece 732 is sealed within the body 702 by means of an o-ring 732, and is removable from the body 702 in order to gain access to the board 704.

In order to re-charge the electrical storage device provided on the board 704, the grip 700 is also preferably provided with a cap 708 that is sealed to the body 702 by means of an o-ring 726. Cap 708 may be removed from the body 702 to provide access to a charging receptacle (for example, including a micro-USB connector) for re-charging the electrical storage device.

FIG. 92 provides a front perspective view of the grip 700 of FIGS. 88-91. FIGS. 93-98 respectively provide top, front, right side, bottom, rear and left side views of the grip 700 of FIGS. 88-91.

Figure 101:
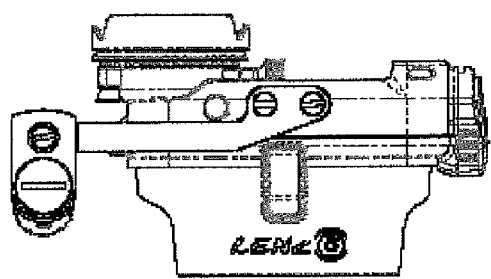
FIGS. 101-106 respectively provide top, rear, left side, front, left side and bottom views of the housing of FIGS. 99 and 100.
Figure 99:
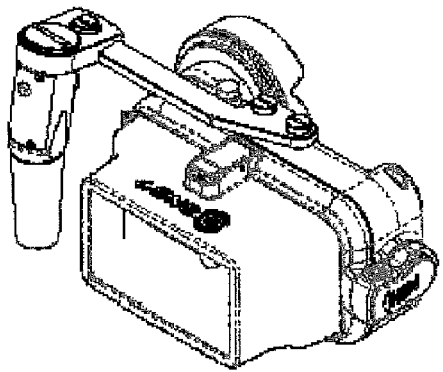
FIGS. 99 and 100 respectively provide a rear and front perspective views of a waterproof camera housing according to aspects of the present disclosure.
Figure 102:
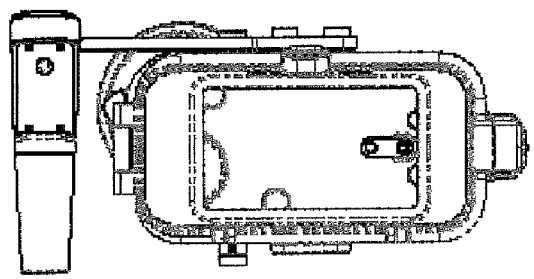
Figure 103:
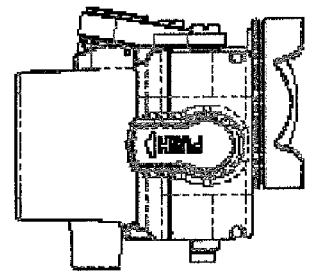
Figure 100:
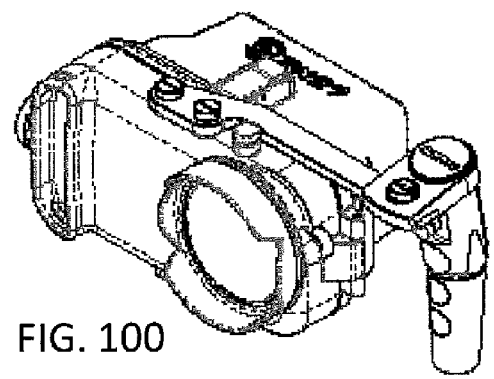
Figure 104:
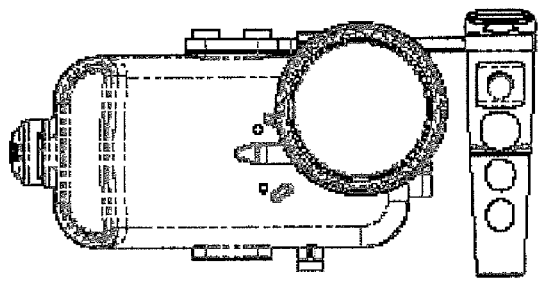
Figure 105:
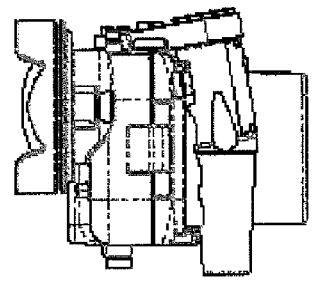
Figure 106:
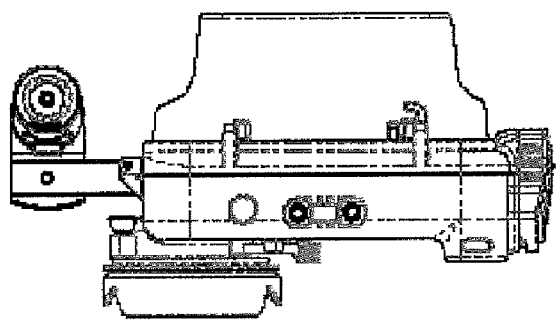

FIGS. 99 and 100 respectively provide a rear and front perspective views of the housing 100 and optional grip 700 of FIGS. 79 and 80. FIGS. 101.-106 respectively provide top, rear, left side, front, left side and bottom views of the housing 100 and optional grip 700 of FIGS. 79 and 80.

REFERENCE CHARACTER TABLE

The following table lists the reference characters and names of features and elements used herein:

| | Feature or element |
|---|---|
| 100 | housing |
| 102 | front bulkhead |
| 104 | front bulkhead hinge member |
| 106 | front bulkhead latch seat member |
| 108 | rear bulkhead |
| 110 | rear bulkhead hinge member |
| 112 | rear bulkhead latch seat member |
| 114 | top button assembly |
| 115 | top button cylinder |
| 116 | tripod/grip mount |
| 118 | bottom button assembly |
| 120 | bottom hinge member |
| 122 | rear-facing camera dome |
| 124 | camera selection button assembly |
| 126 | app selection button assembly |
| 128 | power button assembly |
| 130 | actuator seat |
| 132 | spring clamp |
| 134 | side pad |
| 135 | holder |
| 136 | retention member |
| 136a | retention member lever |
| 136b | retention member tab |
| 137 | retention well |
| 138 | filter lever stop |
| 140 | filter lever seat |
| 142 | locking pin assembly |
| 144 | locking pin |
| 146 | locking pin recess |
| 148 | locking pin biasing spring |
| 150 | locking pin retaining washer |
| 162 | actuator assembly cylinder |
| 164 | home button actuator |
| 166 | recess |
| 167 | dam |
| 172 | hinge member |
| 174 | latch plate |
| 200 | actuator assembly |
| 202 | o-ring retainer washer |
| 204 | shaft |
| 206 | extension member |
| 208 | first probe |
| 210 | second probe |
| 212 | control member |
| 214 | stop member |
| 216 | biasing spring |
| 218 | o-ring |
| 300 | lens apparatus |
| 302 | dome port housing |
| 304 | dome port housing light shade |
| 306 | dome port housing o-ring |
| 308 | dome port housing light blocking mask |
| 310 | dome port housing locking pin seat |
| 312 | optical dome |
| 314 | optical dome o-ring |
| 400 | filter assembly |
| 402 | external lever |
| 404 | external lever o-ring |
| 406 | filter frame |
| 408a, b | filter |
| 500 | latch |
| 502 | latch body |
| 502a | cam slot |
| 502b | outer cam slot wall |
| 502c | inner cam slot wall |
| 504 | latch cover retainer |

-continued

| | Feature or element |
|---|---|
| 506 | locking pin |
| 508 | retainer screw |
| 510 | washer |
| 512 | washer |
| 514 | washer |
| 516 | extended latch strike |
| 516a | extended latch strike pin |
| 518 | guide pin |
| 520 | spring |
| 600 | rear-facing light shade |
| 602a | hinge member |
| 602b | movable hinge member |
| 602c | slit |
| 604 | shade body |
| 606 | shade latch |
| 650 | light mask |
| 700 | grip |
| 702 | body |
| 704 | wireless network circuit board |
| 706 | cover |
| 708 | cap |
| 710 | extension |
| 712 | support plate |
| 714 | locking screw |
| 716 | locking screw |
| 718 | trigger |
| 720 | retainer washer |
| 722 | o-ring |
| 724 | spring |
| 726 | o-ring |
| 728 | display window |
| 729 | o-ring |
| 730 | retainer washer |
| 732 | o-ring |
| 800 | digital device |
| 802 | touch screen |
| 804 | front-facing camera |

It will be understood that, while various aspects of the present disclosure have been illustrated and described by way of example, the invention claimed herein is not limited thereto, but may be otherwise variously embodied within the scope of the following claims.

We claim:
1. A housing for holding a digital device having a touch screen, the housing comprising:
an aperture and at least one recess formed therein for positioning proximate the touch screen of the digital device when said digital device is positioned within the housing; and
an actuator, the actuator comprising:
a shaft extending through the aperture of the housing,
a control member connected to an outer end of the shaft,
a stop member affixed to one of the shaft or the control member for contacting said housing or engaging said recess,
an extension member connected to an inner end of the shaft, and
a first probe affixed to the extension member proximate said shaft, and a second probe affixed to the extension member at an off-center position relative to a center axis defined by the shaft, wherein the second probe is compressible and outer surfaces of the first and second probes respectively terminate at first and second positions in a direction of the center axis of the shaft; with the second position along the center axis being distally further from the control member than the first position;

wherein the control member is simultaneously operable to rotate the extension member about the center axis of the shaft along a circular path defining a first radial segment and to urge the second probe to contact the touch screen for carrying out a screen touch or "touch-swipe" motion across the touch screen, wherein the stop member is operable when the extension member is within the first radial segment to engage an outer surface of the housing and prevent the first probe to contact the touch screen, and wherein the stop member is operable when the extension member is at a predetermined position outside of the first radial segment to engage the recess of the housing, thereby permitting the control member to urge the first probe member to contact the touch screen.

2. The housing of claim 1, wherein the first and second probes comprise at least one conductive material having a predetermined electrical capacitance characteristic.

3. The housing of claim 1, further comprising a biasing member adapted to urge the shaft in a direction away from the touch screen when the digital device is located within the housing.

4. The housing of claim 3, wherein said biasing member is a spring.

5. The housing of claim 1, wherein the recess is located such that when said stop member engages the recess the second probe does not contact a touch sensitive portion of the digital device.

6. The housing of claim 5, further comprising interfering features disposed on said housing for contacting the extension member and alerting a user that the stop member is aligned with the recess.

7. The housing of claim 1, further comprising a gasket on the actuator shaft proximate the housing aperture for creating a watertight seal.

8. The housing of claim 1, wherein the recess is a slot proximate the shaft.

9. The housing of claim 1, wherein the control member is a gripping feature on the outer end of the shaft.

10. A method for providing an actuator in a housing for holding a digital device having a touch screen; said method comprising the steps of:

positioning a shaft of the actuator to extend through an aperture in the housing, said housing having at least one recess formed therein for positioning proximate the touch screen of the digital device when said digital device is positioned within the housing, configuring the actuator to comprise the shaft; a control member connected to an outer end of the shaft, a stop member affixed to one of the shaft or the control member for contacting said housing or engaging said recess, an extension member connected to an inner end of the shaft, a first probe affixed to the extension member proximate said shaft, and a second probe affixed to the extension member at an off-center position relative to a center axis defined by the shaft, disposing the first and second probes in said housing such that outer surfaces of the first and second probes respectively terminate at first and second positions along a direction of the center axis of the shaft; with the second position along the center axis being distally further from the control member than the first position;

forming at least a portion of the second probe proximate its outer surface with a compressible material;

configuring the control member to further enable a user to rotate the control member to simultaneously rotate the extension member about the center axis of the shaft along a circular path defining a first radial segment and to urge the second probe to contact the touch screen for carrying out a screen touch or a "touch-swipe" motion across the touch screen, and configuring the stop member to (a) engage an outer surface of the housing and prevent the first probe to contact the touch screen when the extension member is within the first radial segment; and (b) engage the recess of the housing when the extension member is at a predetermined position outside of the first radial segment to thereby permit the control member to urge the first probe member to contact the touch screen.

11. The method of claim 10 further comprising the step of forming the first and second probes with at least one conductive material having a predetermined electrical capacitance characteristic.

12. The method of claim 10 further comprising the step of disposing a biasing member proximate the shaft to urge the shaft in a direction away from the touch screen when the digital device is located within the housing.

13. The method of claim 10 further comprising the step of positioning the recess such that when said stop member engages the recess the second probe does not contact a touch sensitive portion of the digital device.

14. The method of claim 13 further comprising the step of disposing interfering features on said housing for contacting the extension member and alerting a user that the stop member is aligned with the recess.

15. The method of claim 10 further comprising the step of creating a watertight seal by disposing a gasket on the actuator shaft proximate the housing aperture.

16. The method of claim 10 further comprising the step of forming the control member as a gripping feature on the outer end of the shaft.

\* \* \* \* \*